United States Patent
Fullerton et al.

(10) Patent No.: US 10,694,219 B2
(45) Date of Patent: Jun. 23, 2020

(54) SYSTEM AND METHOD FOR MEDIA SYNCHRONIZATION AND COLLABORATION

(71) Applicant: GITCIRRUS, LLC, Huntsville, AL (US)

(72) Inventors: Larry W. Fullerton, New Hope, AL (US); Mark D. Roberts, Huntsville, AL (US); Dennis M. Weldy, Madison, AL (US); Eric Fullerton, Huntsville, AL (US)

(73) Assignee: GITCIRRUS, LLC, Huntsville, AL (US)

( * ) Notice: Subject to any disclaimer, the term of this patent is extended or adjusted under 35 U.S.C. 154(b) by 0 days.

(21) Appl. No.: 15/688,519

(22) Filed: Aug. 28, 2017

(65) Prior Publication Data
US 2019/0014355 A1    Jan. 10, 2019

Related U.S. Application Data

(63) Continuation of application No. 15/596,916, filed on May 16, 2017, and a continuation-in-part of (Continued)

(51) Int. Cl.
| | | |
|---|---|---|
| *H04N 21/21* | (2011.01) | |
| *H04N 21/27* | (2011.01) | |
| *H04N 21/4223* | (2011.01) | |
| *H04N 21/8547* | (2011.01) | |
| *G11B 27/028* | (2006.01) | |
| *H04N 21/475* | (2011.01) | |
| *H04L 29/06* | (2006.01) | |
| *H04N 21/242* | (2011.01) | |
| *H04N 21/258* | (2011.01) | |

(Continued)

(52) U.S. Cl.
CPC ..... *H04N 21/21805* (2013.01); *G11B 27/028* (2013.01); *G11B 27/102* (2013.01); *G11B 27/34* (2013.01); *H04L 65/602* (2013.01); *H04L 65/80* (2013.01); *H04N 21/242* (2013.01); *H04N 21/25841* (2013.01); *H04N 21/2743* (2013.01); *H04N 21/4223* (2013.01); *H04N 21/4756* (2013.01); *H04N 21/8547* (2013.01); *G06F 3/0482* (2013.01); *G06F 2203/04803* (2013.01); *H04L 47/283* (2013.01); *H04L 67/06* (2013.01); *H04L 67/2804* (2013.01)

(58) Field of Classification Search
None
See application file for complete search history.

(56) References Cited

U.S. PATENT DOCUMENTS

| | | | |
|---|---|---|---|
| 2005/0108373 A1* | 5/2005 | Dewey | H04L 67/104 709/223 |
| 2008/0092047 A1* | 4/2008 | Fealkoff | G06F 16/78 715/716 |

(Continued)

*Primary Examiner* — Xavier Szewai Wong

(57) ABSTRACT

An improved recording device and method of recording involve a communications interface that establishes communications with a common clock reference across a network, a data storage, and a processor that controls the storing in the data storage of a metadata file with at least one of a recorded media data file or a recorded sensor data file. The metadata file includes a time sample received from the common clock reference.

17 Claims, 20 Drawing Sheets

Related U.S. Application Data application No. 14/988,568, filed on Jan. 5, 2016, now abandoned.

(60) Provisional application No. 62/340,013, filed on May 23, 2016, provisional application No. 62/099,937, filed on Jan. 5, 2015.

(51) Int. Cl.
| | |
|---|---|
| *G11B 27/10* | (2006.01) |
| *G11B 27/34* | (2006.01) |
| *H04N 21/218* | (2011.01) |
| *H04N 21/2743* | (2011.01) |
| G06F 3/0482 | (2013.01) |
| H04L 29/08 | (2006.01) |
| H04L 12/841 | (2013.01) |

(56) References Cited

U.S. PATENT DOCUMENTS

| | | | |
|---|---|---|---|
| 2012/0308209 A1* | 12/2012 | Zaletel | G11B 27/034 386/278 |
| 2013/0259447 A1* | 10/2013 | Sathish | H04N 9/87 386/278 |
| 2016/0112649 A1* | 4/2016 | Nowak | G11B 27/031 348/36 |
| 2016/0197837 A1* | 7/2016 | Fullerton | H04L 47/283 370/238 |
| 2018/0316853 A1* | 11/2018 | Liang | H04N 5/23222 |

* cited by examiner

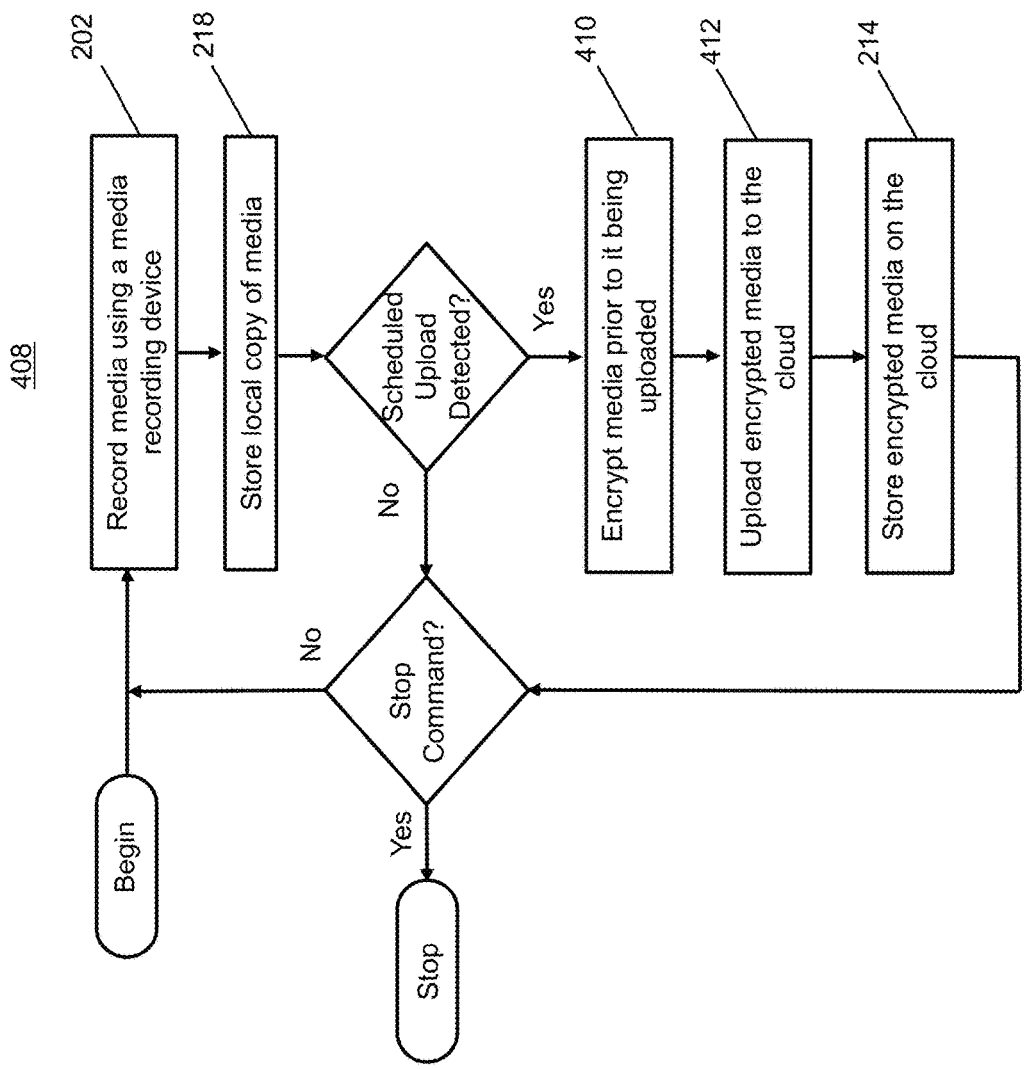

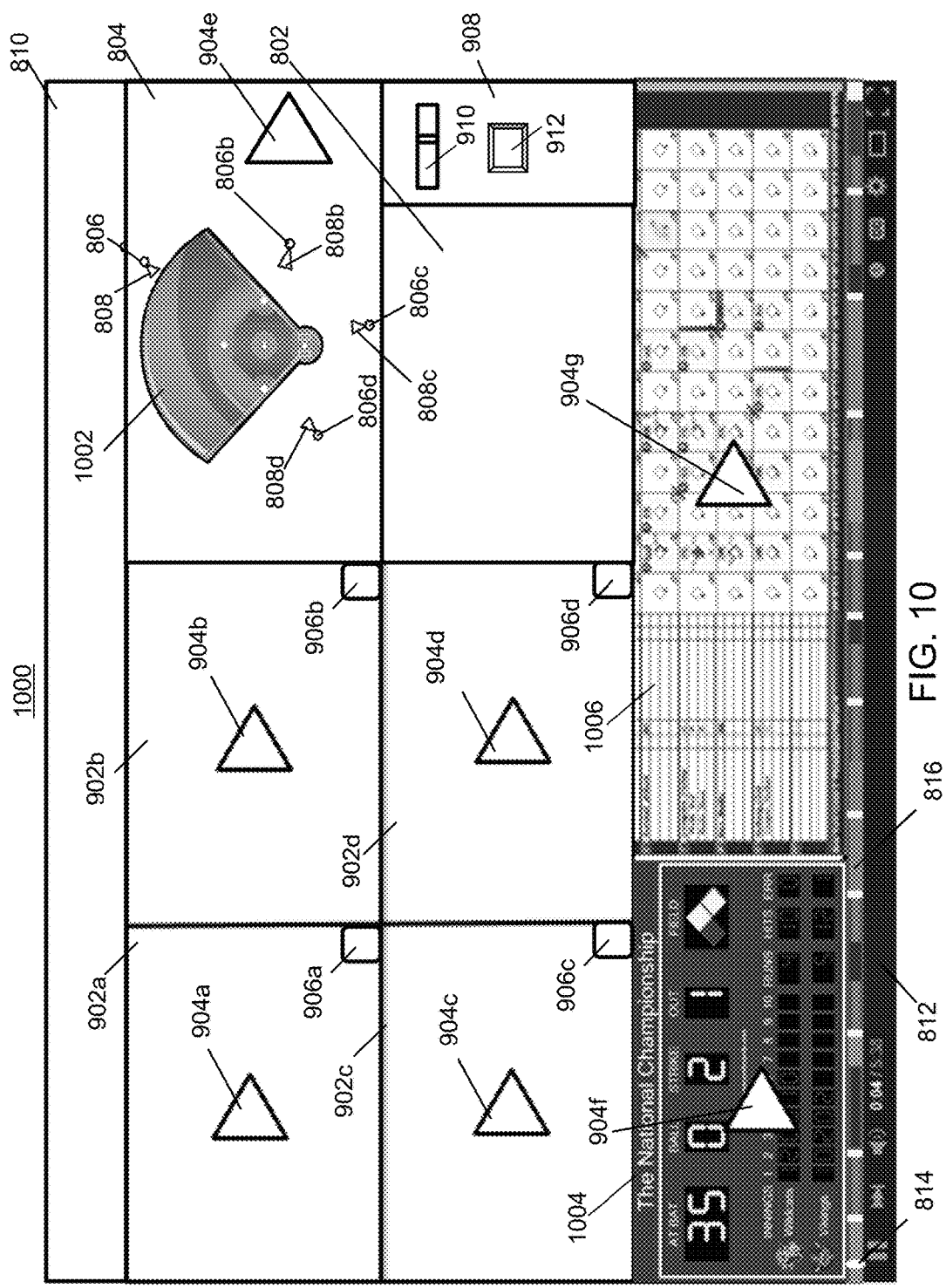

SYSTEM AND METHOD FOR MEDIA SYNCHRONIZATION AND COLLABORATION

CROSS-REFERENCE TO RELATED APPLICATIONS

This U.S. Non-provisional application is a continuation of U.S. patent application Ser. No. 15/596,916, filed May 16, 2017, which claims the benefit of U.S. Provisional Patent Application No. 62/340,013, filed May 23, 2016, titled "A System and Method for Cloud-based Media Streaming". U.S. patent application Ser. No. 15/596,916 is a continuation-in-part of U.S. patent application Ser. No. 14/988,568, filed Jan. 5, 2016, which claims the benefit of U.S. Provisional Patent Application No. 62/099,937, filed Jan. 5, 2015, titled "A System and Method for Cloud-based Media Streaming".

These patent applications are each incorporated by reference herein in their entirety.

FIELD OF THE INVENTION

The present invention relates generally to a system and method for media synchronization and collaboration. More particularly, the present invention relates to a system and method for media synchronization and collaboration, where metadata is used to synchronize media allowing multiple views of an event recorded independently by multiple media recording devices to be synchronized and combined into a collaborative media file.

SUMMARY OF THE INVENTION

Briefly, one aspect of the present invention involves an improved recording device that includes a communications interface that establishes communications with a common clock reference across a network, a data storage, and a processor, the processor controlling the storing in the data storage of a metadata file with at least one of a recorded media data file or a recorded sensor data file, the metadata file including a time sample received from the common clock reference.

The recording device may also include a magnetometer that provides a magnetometer measurement of the view angle of the recording device, where the metadata file includes the magnetometer measurement.

The recording device may also include a location system that provides location information of the location of the recording device within a coordinate system, where the metadata file includes the location information.

The recording device may also include a movement measurement device that provides a movement measurement of the movement of the recording device, where the metadata file includes the movement measurement.

The recording device may also include a sensor that provides an environmental measurement of an environmental condition, where the metadata includes the environmental measurement.

The recording device may also include a sensor that provides a physical condition measurement of a physical condition of a person or animal, where the metadata file includes the physical condition measurement.

The common clock reference can be a universal clock, which can be an atomic clock.

The recording device can be a smartphone.
The recording device can be a still camera.
The recording device can be a video camera.
The media recording device of claim 1, where the media recording device is an audio recorder.

Another aspect of the present invention involves an improved method for recording, including providing a recording device that records at least one of a plurality of recorded media files or a plurality of recorded sensor data files, where the recording device has a communications interface that establishes communications with a common clock reference across a network, providing a data storage, and controlling the storing of a metadata file with at least one of each recorded media file of the plurality of recorded media files or each recorded sensor data file of the plurality of recorded sensor data files that is stored in the data storage, where the metadata file includes a time sample received from the common clock reference.

The method may further include providing a magnetometer measurement of the view angle of the recording device, where the metadata file including the magnetometer measurement.

The method may further include providing location information of the location of the recording device within a coordinate system, where the metadata file includes the location information.

The method may further include providing a movement measurement of the movement of the recording device, where the metadata file includes the movement measurement.

The method may further include providing an environmental measurement of an environmental condition, where the metadata file includes the environmental measurement.

The method may further include providing a physical condition measurement of a physical condition of a person or animal, where the metadata file includes the physical condition measurement.

The common clock reference can be an atomic clock.
The recording device can be one of a smartphone, a still camera, a video recorder, an audio recorder, or a sensor.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 4C depicts an eleventh exemplary method in accordance with the invention;

FIG. 10 depicts an exemplary graphical user interface of a multiple view media player for producing a composite video from media and metadata corresponding to multiple views of a baseball game in accordance with the invention.

DETAILED DESCRIPTION OF THE INVENTION

Figure 1:
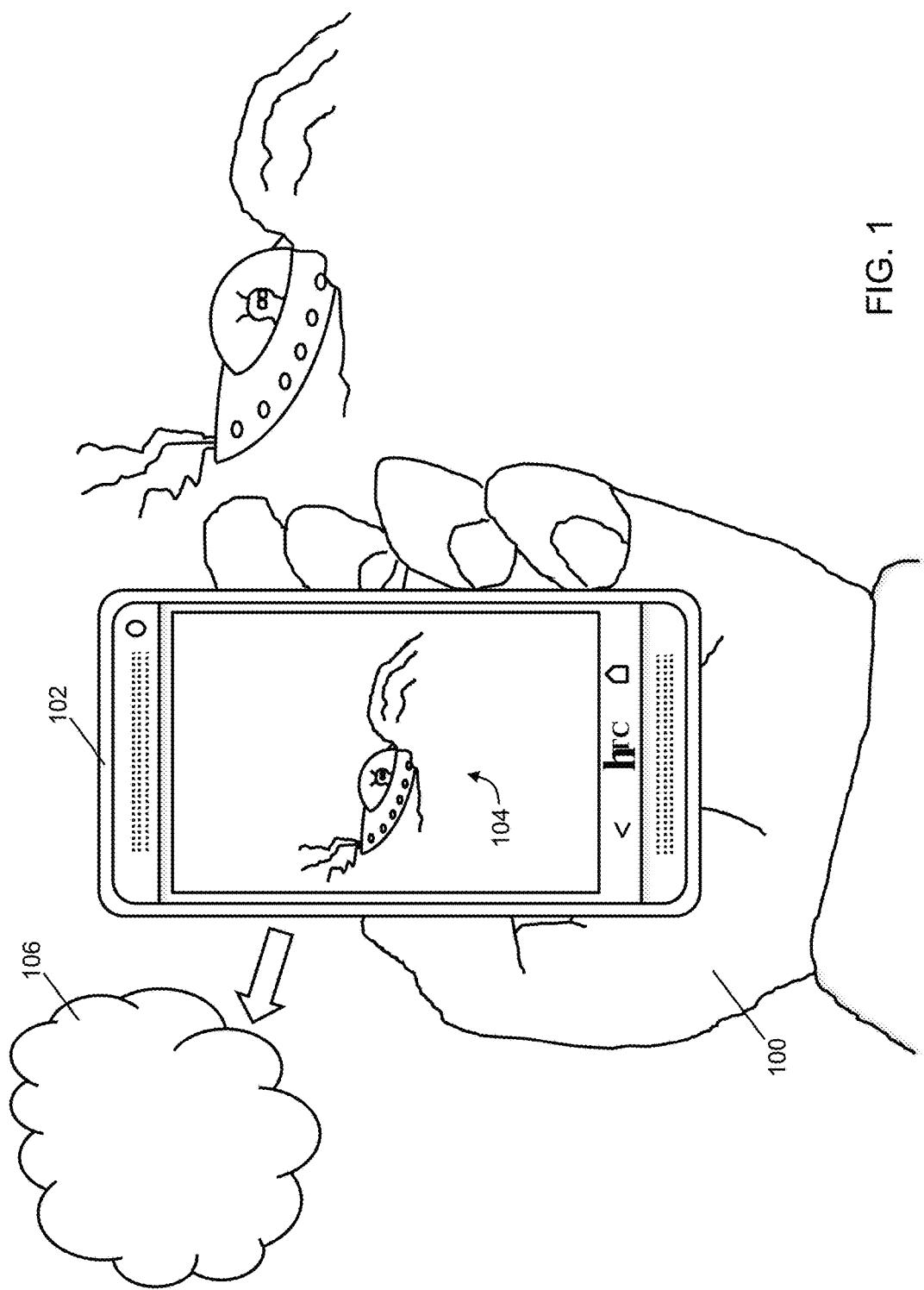
FIG. 1 depicts a user of a phone recording an event that is conveyed to the cloud.
Figure 2A:
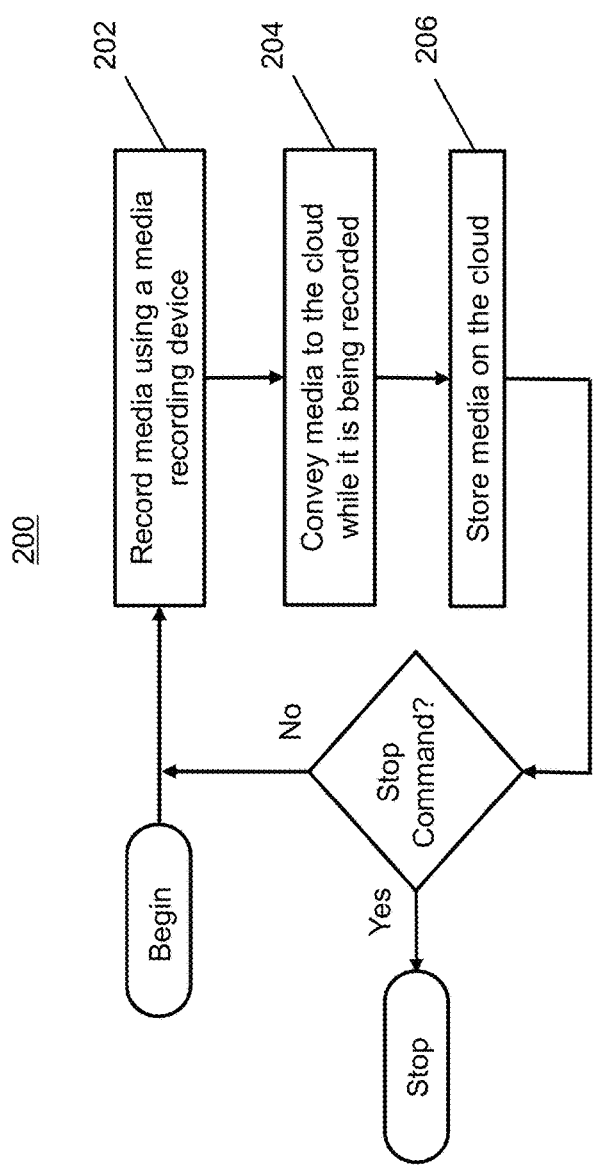
FIG. 2A depicts a first exemplary method in accordance with the invention.
Figure 2B:
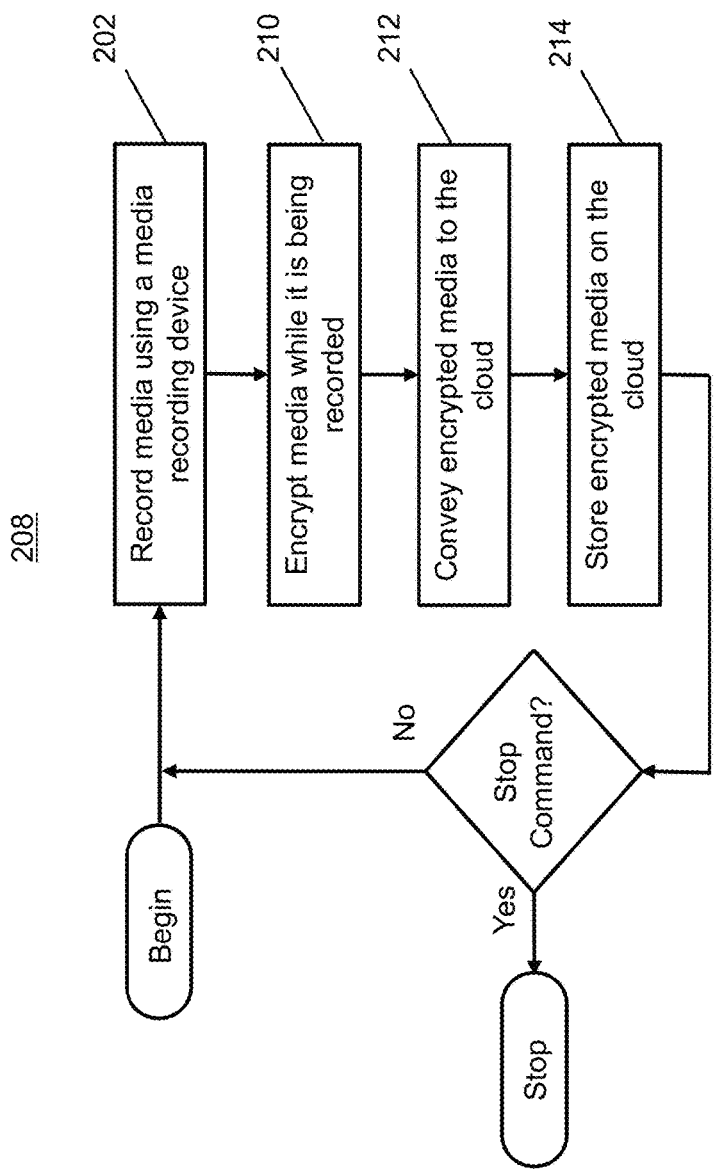
FIG. 2B depicts a second exemplary method in accordance with the invention.
Figure 2C:
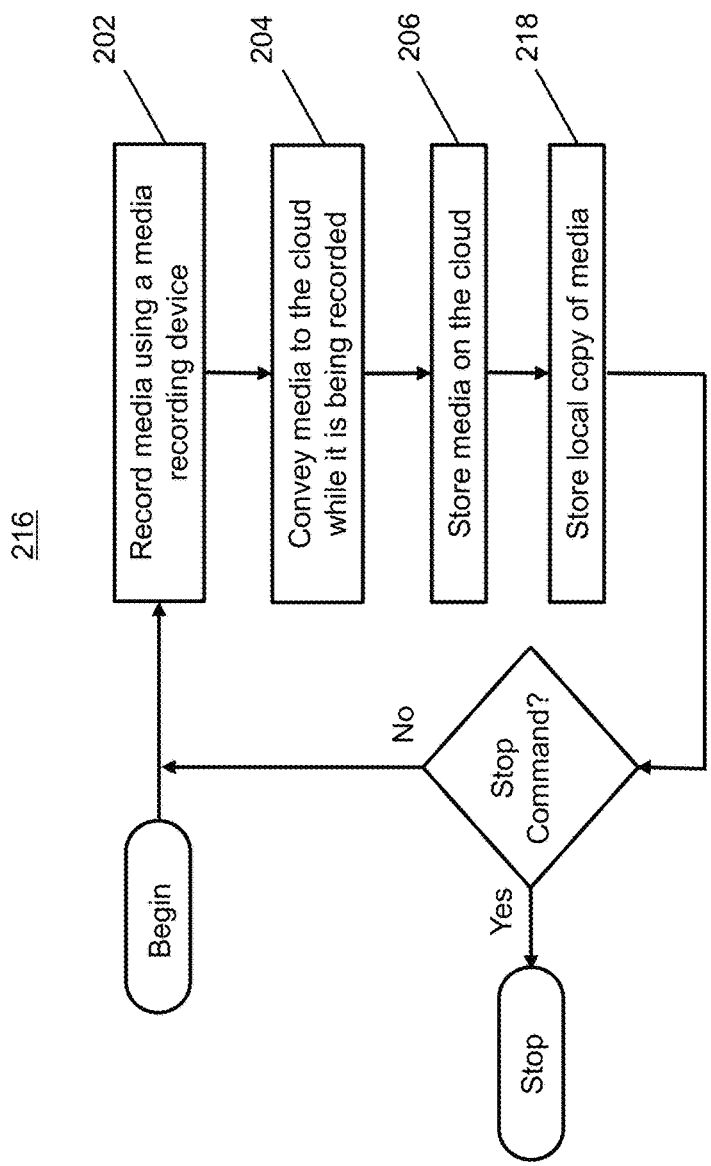
FIG. 2C depicts a third exemplary method in accordance with the invention.
Figure 2D:
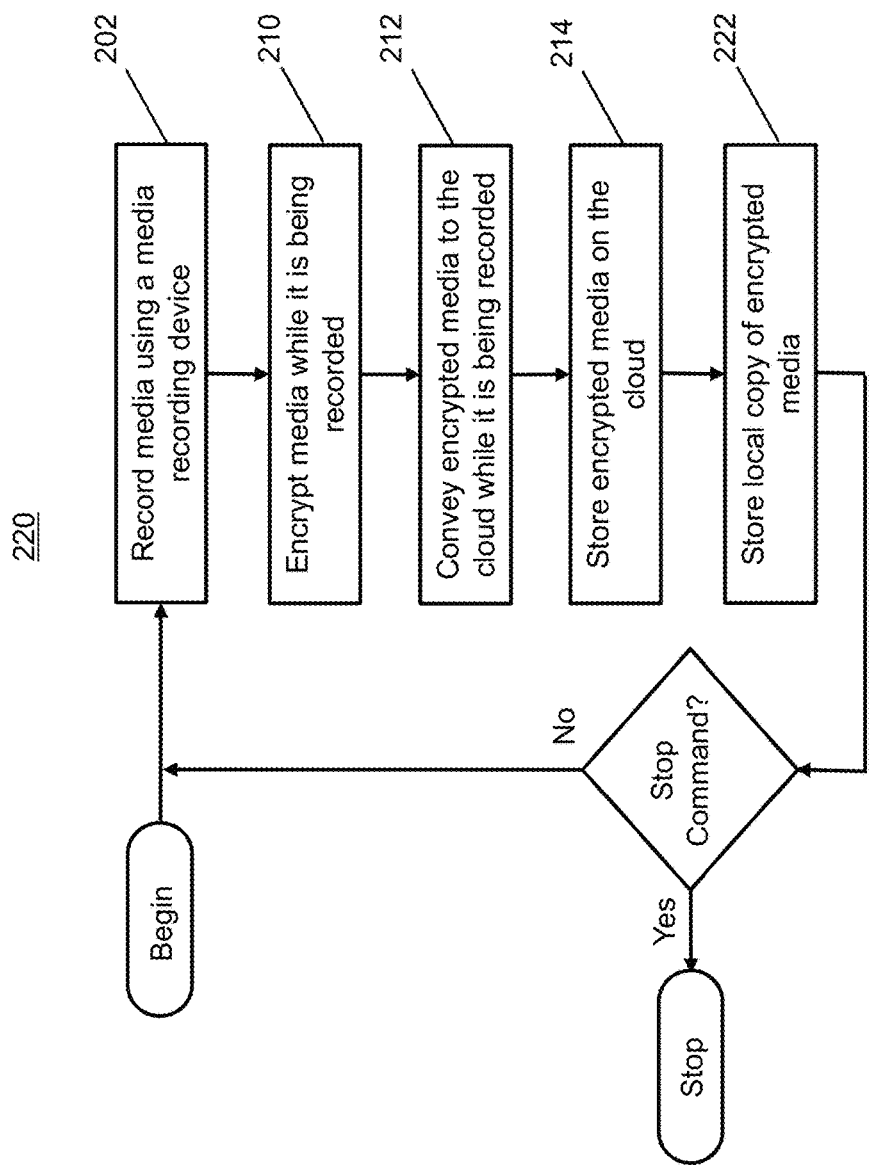
FIG. 2D depicts a fourth exemplary method in accordance with the invention.
Figure 3A:
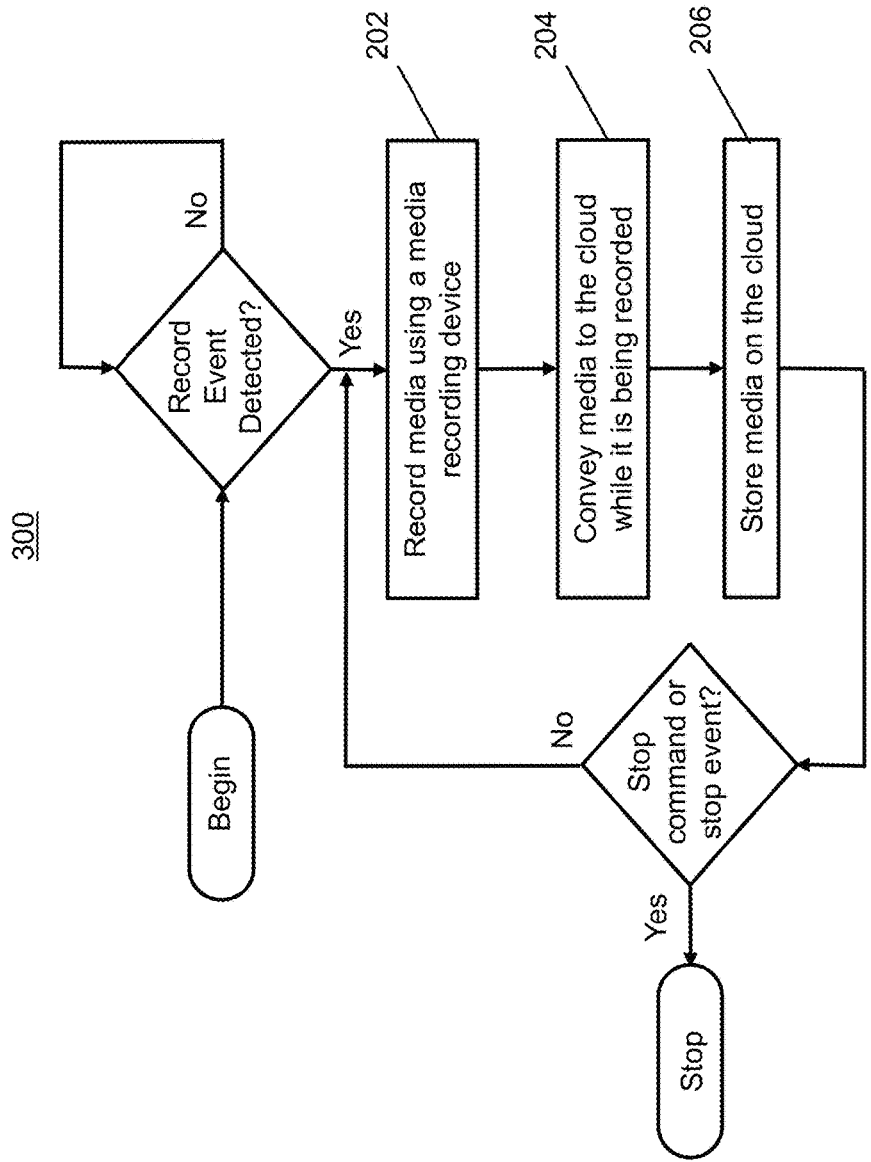
FIG. 3A depicts a fifth exemplary method in accordance with the invention.
Figure 3B:
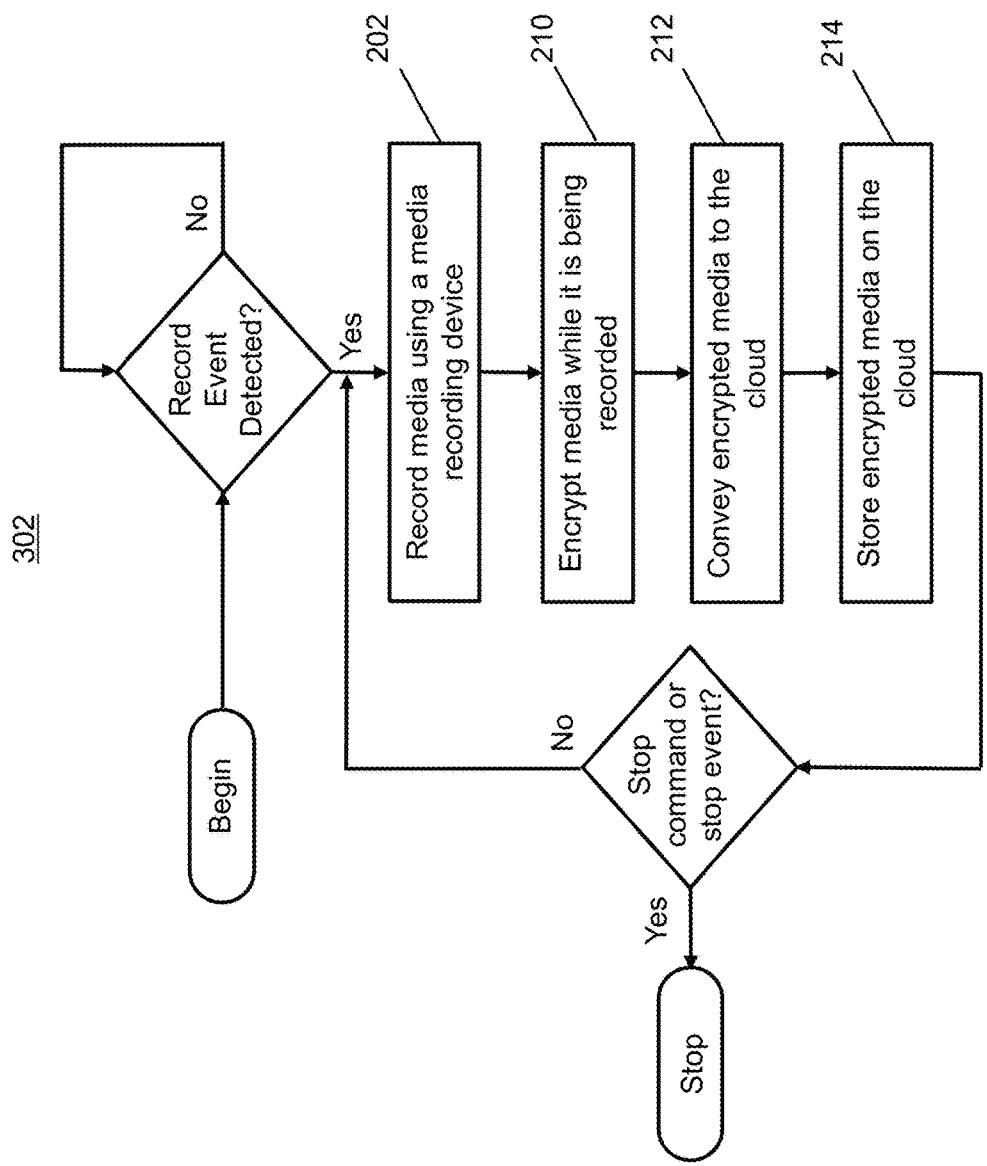
FIG. 3B depicts a sixth exemplary method in accordance with the invention.
Figure 3C:
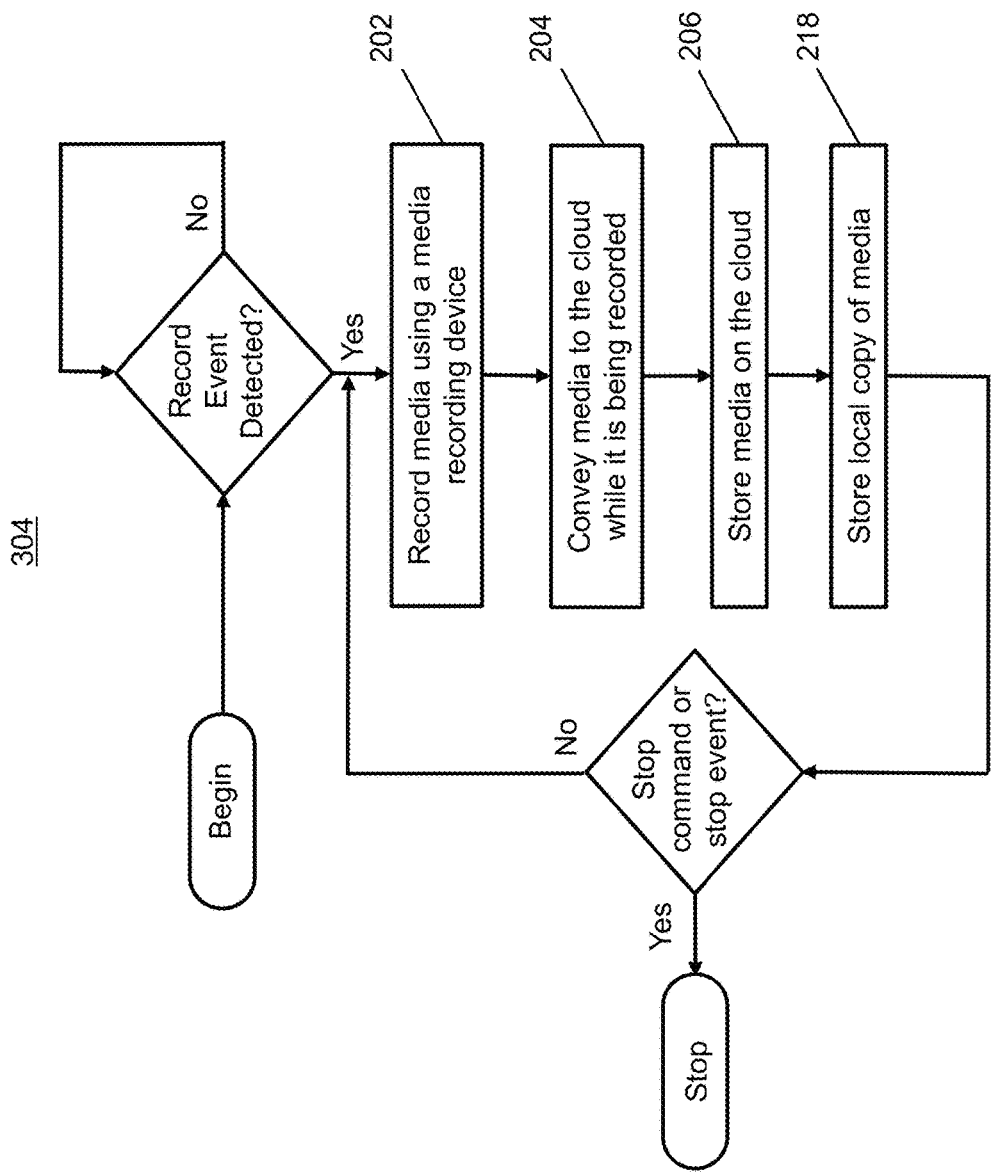
FIG. 3C depicts a seventh exemplary method in accordance with the invention.
Figure 3D:
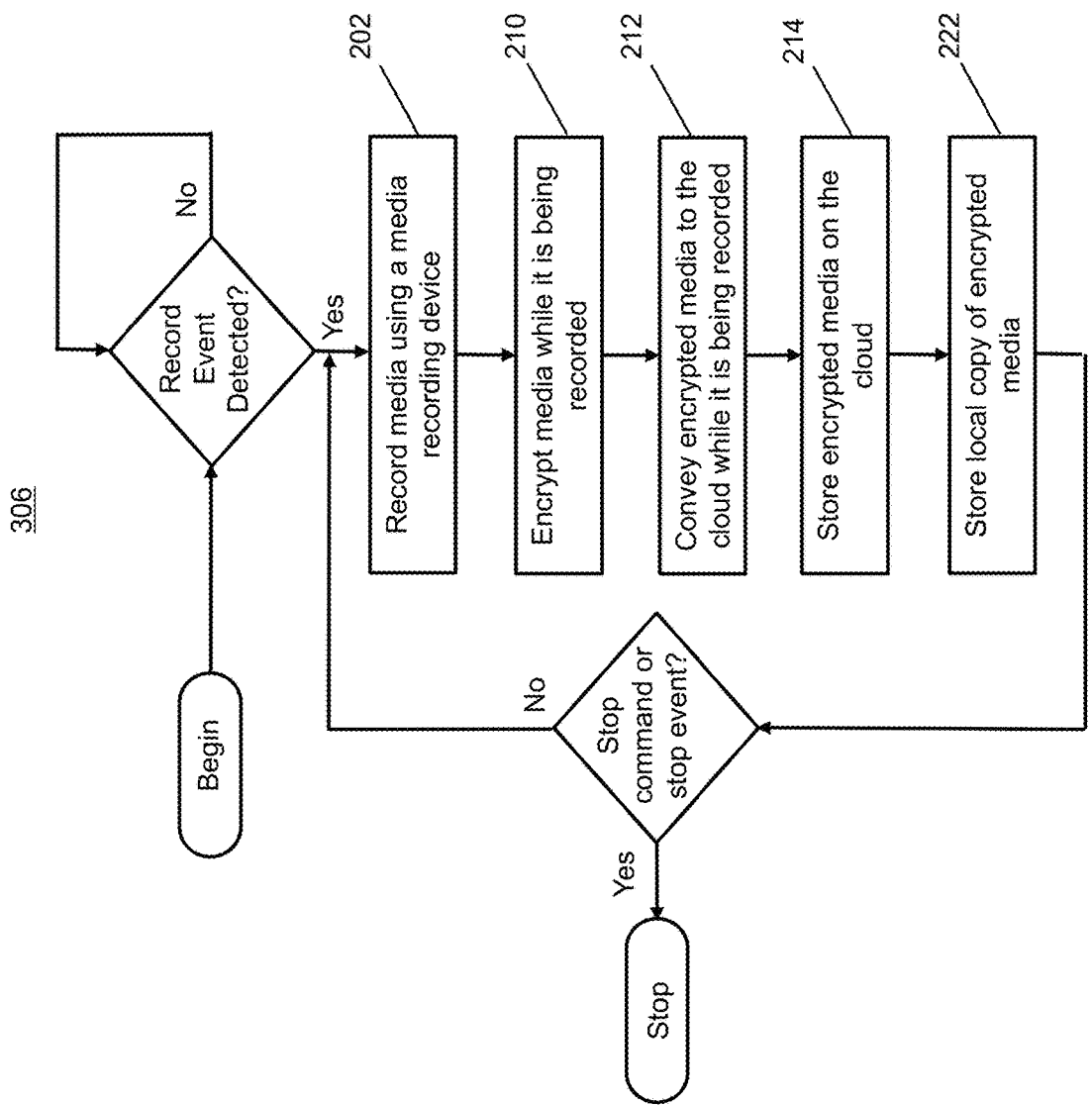
FIG. 3D depicts an eighth exemplary method in accordance with the invention.

In accordance with one aspect of the present invention, a media recording device interfaced with a cloud computing environment (i.e., the "cloud") conveys a recorded media to the cloud in near real-time while the media is being recorded by the media recording device, where the conveying of the media to the cloud may be based upon the occurrence of a user-defined event and/or a user command, where the media may or may not be encrypted and storage of a local copy of the media is optional. The media recording device may also upload to the cloud a previously recorded media stored on the media recording device. The uploading of the previously recorded media may be in accordance with a schedule and/or upon the occurrence of a user-defined event, where the media may be encrypted when stored on the media recording device and subsequently uploaded to the cloud or stored on the media recording device as unencrypted data that is then encrypted as it is uploaded to the cloud or after it has been uploaded to the cloud (i.e., by a cloud service provider as opposed to encryption by the media recording device). Rules may be established and enforced for forbidding access, modification and/or erasure from the recording device and/or the cloud.

Under one arrangement a first recording device forwards a media to a second recording device that conveys the media to the cloud, where the first recording device could be a service interfacing with multiple second recording devices and which could be configured to have substantial network bandwidth significantly greater than that required and typically used by the individual second recording devices.

In accordance with another aspect of the invention, data latency rules can be established to control whether various optional functions pertaining to processing of a recorded media (e.g., encryption, local storage, adding of metadata, etc.) are performed or not or an amount or rate corresponding to a processing function being performed (e.g., data compression level, data sampling rate, data buffering amount, resolution, etc.) for a given recorded media. Data latency rules may be based on one or more established data latency thresholds corresponding to one or more user-defined conditions. For example, a data compression rate and/or data sampling rate may be controlled in real-time as required to keep data latency below an established data latency threshold. Moreover, a data latency threshold may be conditional in that it might be modified or overridden, for example, based on an event such as a sensed event. For example, given a sensed fire condition, all unnecessary processing may be avoided regardless of an established data latency threshold.

Under one arrangement, a user may establish a set of parameters relating to which media data processing functions are to be used or not used and the extent to which they may be used (e.g., sampling rate, amount of data compression, data resolution) so as to control data latency while meeting certain user requirements (e.g., user always wants encryption), where media data processing functions are either turned on or off or an extent (e.g., rate, resolution) changed based on criteria or rules established by a user. Such criteria may determine a sampling rate, an amount of data compression, the extent of which metadata is added. For example, a user may establish a parameter where video is to be captured at a 1080i (i.e., 1920×1080) resolution but, when a certain criteria is met, the resolution is to change to a different resolution, which may be, for example, a lower resolution (e.g., 702p) or higher resolution (8640p).

Under another arrangement a command may be provided by the user of a media recording device to change a mode of operation. For example, an "upload button" might be pressed or an upload voice command may be spoken to cause an upload to the cloud function to be started immediately. Similarly, a "fast upload button" might be pressed or a fast upload function otherwise initiated to cause an upload function to be initiated under conditions that provide for minimal data latency. Generally, a user may establish one or more events that correspond to 'fast load triggers', whereby the occurrence of such an event causes the fast upload function to be initiated.

In accordance with one feature of the invention, a data latency indicator may be provided which might be a number and/or a color or some other indicator.

In accordance with another feature of the invention, an event may result in other applications running on a device (e.g., cell phone) being turned off in order to speed up performance of the device or otherwise reduce data latency.

In accordance with yet another aspect of the invention, access controls can be employed to prevent unauthorized access to or deletion of a recorded media stored on the media recording device and/or on the cloud. One or more deletion events can also be defined by a user, where a local copy of recorded media will be automatically deleted from the media recording device based on the occurrence of a deletion event.

A media recording device can include a video recording device and/or an audio recording device, for example, a camera and a microphone of a mobile phone or a Bluetooth or Wi-Fi connected device, and the media can be, for example, video (still picture or movie) and/or audio data recorded by the video and audio recording devices of the phone, where the recorded media is in the form of digital data. Other examples of media recording devices include a media recording device located in a home or business, a media recording device (e.g., dash cam) located in a vehicle (e.g., car, truck, emergency vehicle, plane, helicopter, drone, etc.), a media recording device (e.g., body cam) associated with a person or animal, or a media recording devices associated with a fixed object (e.g., bridge, tree, light post, gas pump, etc.). Recorded media may be in the form of text, for example, where an audio recording device converts voice to text. Video data may correspond to a picture or video taken from the front (display side) of a cell phone or from the back of a cell phone, or both, which may be taken simultaneously. As such, an event being filmed may be captured at the same time the user of a media recording device is captured (e.g., a selfie).

Encryption of media data, whether stored on the media recording device or on the cloud, may for example involve use of a symmetric key encryption scheme or a public key encryption scheme. Encryption may be performed by the media recording device such that a local copy can be stored in encrypted form and/or media is conveyed to the cloud in encrypted form. Alternatively, media may be conveyed in unencrypted form and then encrypted by a cloud service provider as it is being received and stored on the cloud or sometime after it has been received and stored on the cloud.

Various data access and user authentication methods can be employed to control access and/or deletion to data stored on the media recording device or on the cloud. Such methods may include a password, a signature, or a biometric such as an eye scan, a fingerprint scan, a facial image (i.e., individual's photo, a selfie), a recognized voice, or the like. At least one physical key (e.g., a dongle) may be required to access data, where multiple keys (or dongles) distributed to multiple persons may be required to access or delete data. A third party authentication service provider might be used such as VeriSign. Generally, one skilled in the art of protecting data stored on an electronic device or across a network will understand that all sorts of methods can be employed to control access to data and to authenticate a user, where such controls can also be used to prevent unauthorized data deletion. Moreover, rules can be employed in conjunction with such access control methods, for example, access and/or data deletion may be limited to a certain time period, require a certain aging of data (i.e., an elapsed period of time), require an event to have occurred (such as described below), require the media recording device to be in a certain location, etc. Generally, the concepts described below relating to user-defined events being used to determine the starting and stopping of recording of a media recording device and corresponding conveying of recorded media to the cloud or the uploading of previously recorded media data to the cloud can also be applied for controlling access to and deletion of media stored on the cloud or on the media recording device. Alternatively, it may be desirable that a media can be identified that cannot be deleted from the media recording device and/or from the cloud under any circumstance or without participation by a third party given control over such access/deletion such as an attorney, an editor of a publication, or some third party service.

Under a first arrangement, which is depicted in FIG. 1, a user 100 of a media recording device 102 runs an application (or 'app') or otherwise selects a mode of operation of the media recording device 102 that causes a media 104 to be conveyed to the cloud 106 while the media 104 is being recorded by the media recording device 102 upon the occurrence of a user command. The media may be encrypted by the media recording device prior to the media being conveyed to the cloud. Alternatively, the media may be conveyed to cloud in unencrypted form where it then may or may not be encrypted. Under this arrangement, which may be referred to as a user-activated near real-time mode, storage of a local copy of the media on the media recording device is optional, where the media may be conveyed directly to the cloud and may never actually be stored locally on the media recording device. For example, a user of a mobile phone such as an HTC® phone may record an event with their phone and the media data would be conveyed directly to the cloud as it was being recorded with very low latency between the time a given data packet is recorded until it is stored on the cloud, where the data corresponding to the event would not be stored or otherwise be present on the phone unless it is necessary to temporarily buffer data for some required reason, for example, due to a poor or non-existent data connection between a first and second media recording device or between a media recording device and the cloud. Alternatively, the user may choose to store a local copy of the media data on the phone while also conveying the media data directly to the cloud as the media is being recorded, where the local copy of the media data may be encrypted or unencrypted and where the data conveyed to the cloud may be encrypted prior to being conveyed to the cloud or the data may be encrypted after it has been conveyed to the cloud. For example, unencrypted data might be conveyed to a cloud service provider that encrypts the data it receives from the media recording device prior to storing it, where the time required to encrypt the media would not add to the data latency of the media recording device, but the data would be vulnerable while be conveyed to the cloud because it is in an unencrypted form. Depending on the conditions of a given situation, it may be preferable to reduce data latency of the media recording device by not requiring the media recording device to encrypt a recorded media prior to conveying it to the cloud. As such, a user can establish rules used to control whether such processing is performed or not depending on the conditions of a given situation. For example, a user might set up a rule whereby video footage of a business security system would be automatically encrypted and conveyed to the cloud upon the occurrence of a user-defined security alarm event but encryption should not be performed should a fire condition (e.g., fire alarm, a sensor detecting smoke or heat, etc.) also be detected. Generally, all sorts of rules can be employed to control the processing performed prior to conveyance of media data to the cloud based on one or more conditions so as to control data latency.

FIGS. 2A-2D depict exemplary methods corresponding to a user-activated near real-time mode, where the amount of data latency between the time a given data packet is recorded until it is stored on the cloud depends on whether or not media is encrypted and whether or not a local copy of the media (or encrypted media) is stored on the media recording device. In reference to FIG. 2A, one skilled in the art will recognize that once media has been received by the cloud it may be recorded by a cloud service provider prior to storage or at any time thereafter.

Under a second arrangement, a media recording device is configured to automatically begin and/or stop recording media to be encrypted and conveyed to the cloud while the media is being recorded by a media recording device upon the occurrence of a defined event or events. Under this arrangement, which may be referred to as an event-activated near real-time mode, storage of a local copy of the media on the media recording device is optional, where the local copy of the media data may be encrypted or unencrypted while stored on the media recording device.

An event can be generally described as an occurrence that meets an established criterion, condition or rule that can be recognized by a control system (e.g., an application running on a cell phone). For example, an event may be based on a position of an object/person/animal/vehicle, for example, a cell phone's specific location (i.e., latitude, longitude) as might be determined by a location system such as a global positioning system (GPS). An event might correspond to a status of a media recording device, for example, a battery status or a signal strength status. Similarly, an event might be based on a position of an object relative to a location of another object, where both objects might be fixed or mobile. Such location based events are commonly known as geolocation events where, generally, an event can be defined based on the location of one or more objects relative to one or more defined areas (e.g., a perimeter or a property or a building, or a room within a building) corresponding to one or more locations. An event may be based on movement, lack of movement, or a change in movement (e.g., speed or direction) of an object, which might be detected using a compass. For example, an 'impact threshold' may be established corresponding to an abrupt movement change indicating an impact associated with a media recording device (e.g., hitting the ground, being in a vehicle crash, etc.).

An event may be based on a position, for example, a position of the phone within a coordinate system. An event may relate to a movement of the phone or the non-movement of the phone, which might be detected using an accelerometer. An event may relate to a detected movement, which might be detected by a motion or proximity detector/radar. An event may be based on an orientation of an object, which might be measured using a 6-DOF measurement device. In one arrangement, the orientation of a phone may be determined using a magnetometer contained in a media recording device.

An event may be based upon an emergency or alarm situation, which might involve a severe weather advisory or warning relating to a thunderstorm, tornado, hurricane, snowstorm, high wind, etc. or any other sort of emergency situation such as a vehicle accident or crash, a break-in, a fire, a flood, a landslide, a prisoner escape, a riot, a hazardous materials spill, a runaway train, an airplane experiencing an emergency situation, etc. For example, a media recording device may be set to automatically begin recording if a nearby nuclear reactor alarm were to sound or if a person presses a medical alert button.

An event might involve a government controlled security level, for example, a Transportation Security Administration (TSA) security level, Home Security level, or DEFCON level.

An event might be a sensed environmental condition such as a sensed temperature, humidity, light, smoke, carbon dioxide, seismic event, sound intensity and/or frequency, pressure, altitude, water depth, or the like, which might be measured using one or more sensors. For example, a sensor might detect an earthquake, an explosion, thunder, a gunshot, or a scream. Similarly, an event might be a sensed physical condition of a person or animal such as a heart rate, breathing rate, skin resistivity, blood pressure, body temperature, blood sugar level, etc. One skilled in the art will also recognize that if the media recording device is configured to received sensed information then the media recording device can also perform various other processing beyond uploading media to the cloud relating to the sensed information. For example, seismic information sensed by the media recording device might be used to identify the location, timing, and magnitude of a seismic event, which might even be used to determine an amount of time before a catastrophic even will occur at the location of the recording media device for providing warning, instructions, or other relevant information.

An event may involve the recognition of a command such as a voice command, a hand gesture, or a RF signal command.

FIGS. 3A-3D depict exemplary methods corresponding to an event-activated near real-time mode, where the amount of data latency between the time a given data packet is recorded until it is stored on the cloud depends on whether or not media is encrypted and whether or not a local copy of the media (or encrypted media) is stored on the media recording device. In reference to FIG. 3A, one skilled in the art will recognize that once media has been received by the cloud it may be recorded by a cloud service provider prior to storage or at any time thereafter.

Under the first or second arrangements, efforts can be made to limit latency between recording and conveyance to the cloud to an amount less than or equal to a defined latency limit, where to meet an established latency limit, storing of a local copy of the media and/or encryption of the local copy may not occur.

Under a third arrangement, a local copy of a recorded media is stored on the media recording device and all or part of the stored local copy of the media is encrypted and conveyed to the cloud in accordance with a defined schedule. The scheduled uploading of the media to the cloud may be referred to as a scheduled upload mode, where the local copy of the media data may be encrypted or unencrypted while stored on the media recording device. Optionally, the media data can be automatically deleted from the media recording device once it has been conveyed to the cloud. For example, a user of a phone may choose to have media data moved from a phone to the cloud weekly, daily, hourly, or at specific scheduled times and/or in response to an event, for example, a voice command, a location, an emergency condition, etc. The media may be stored and uploaded using a rolling period of time, for example, at the end of each day, the stored media data from the same day one week prior may be automatically deleted such that, at any given time, there is stored media data for the most recent seven days, where the rolling periodic upload mode can be overridden, the rolling period of time can be changed (increased or decreased), and specific subsets of stored media data can be identified as not to be deleted. For example, a rolling period of time mode might be configured to only delete media data from 12 pm to 6 am or to never delete data recorded on a Saturday. Generally, one skilled in the art will recognize that all sorts of options for controlling one or more periods of time where stored media data would be uploaded to the cloud and automatically deleted from local storage, or not, are possible.

Figure 4A:
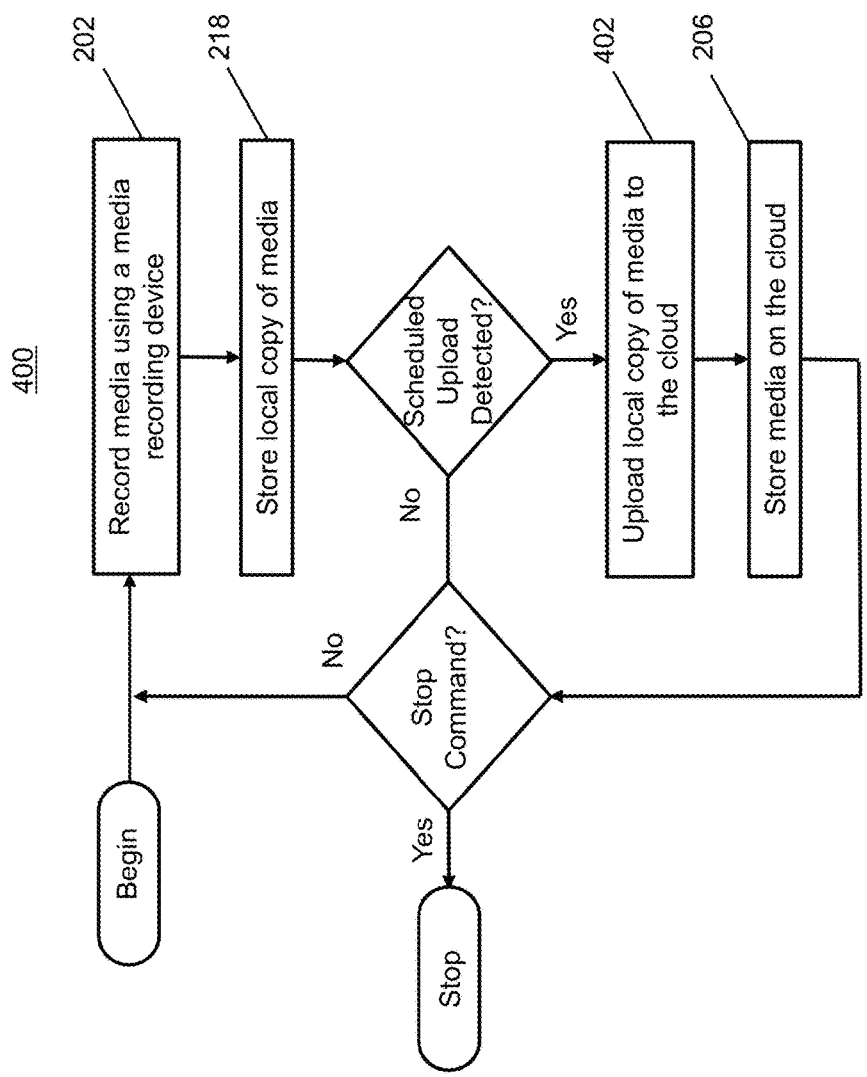
FIG. 4A depicts a ninth exemplary method in accordance with the invention.
Figure 4B:
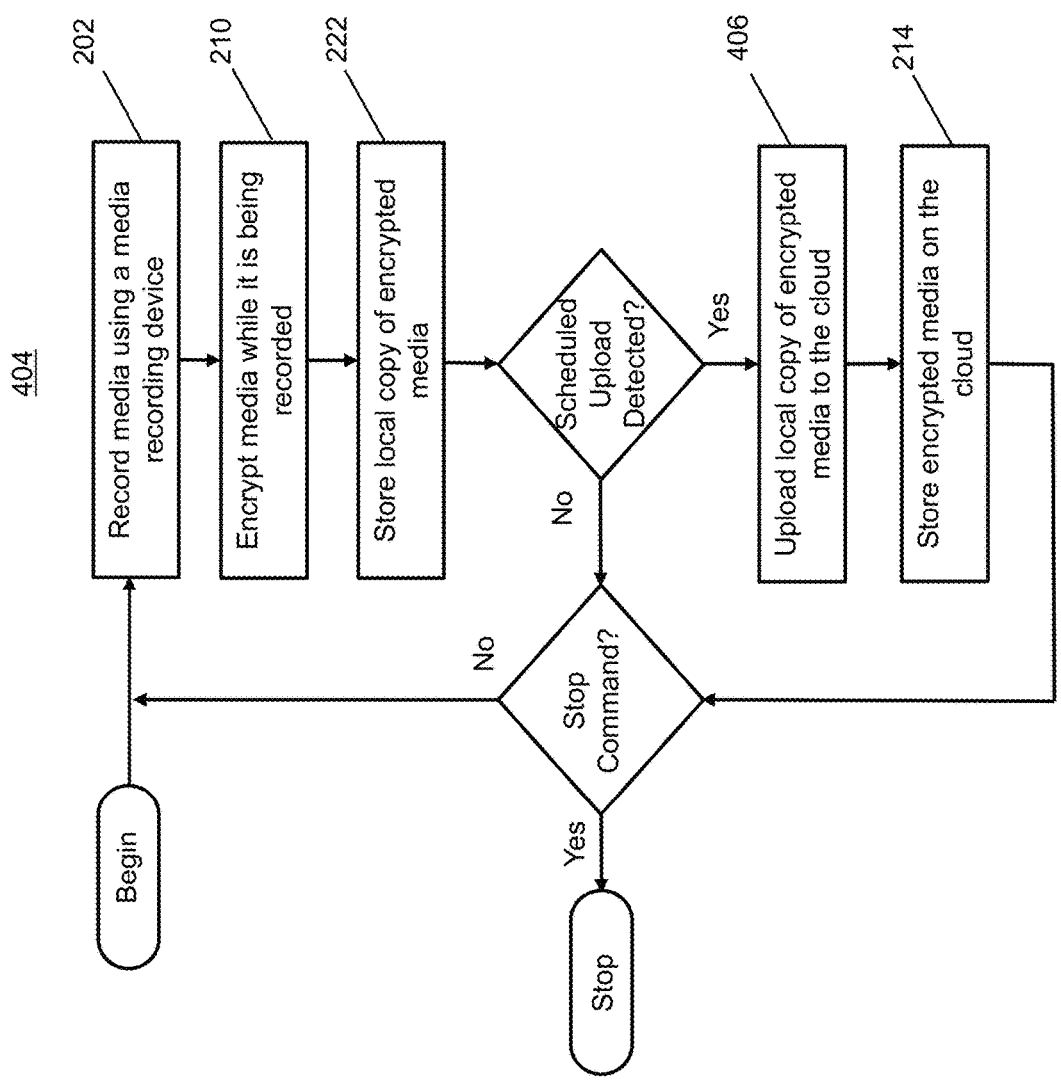
FIG. 4B depicts a tenth exemplary method in accordance with the invention.

FIGS. 4A-4C depict exemplary methods corresponding to a scheduled update mode, where the amount of data latency between the time uploading of a stored media begins until it is stored on the cloud depends on whether or not the media is encrypted by the media recording device. In reference to FIG. 4A, one skilled in the art will recognize that once media has been received by the cloud it may be recorded by a cloud service provider prior to storage or at any time thereafter.

Under a fourth arrangement, a local copy of a recorded media is stored on a media recording device and then later automatically conveyed to a cloud computing environment upon the occurrence of an event, such as described above, where the media may be encrypted prior to being conveyed to the cloud and where the local copy of the media data may be encrypted or unencrypted while stored on the media recording device. Optionally, the media data can be automatically deleted from the media recording device once it has been conveyed to the cloud.

Figure 5A:
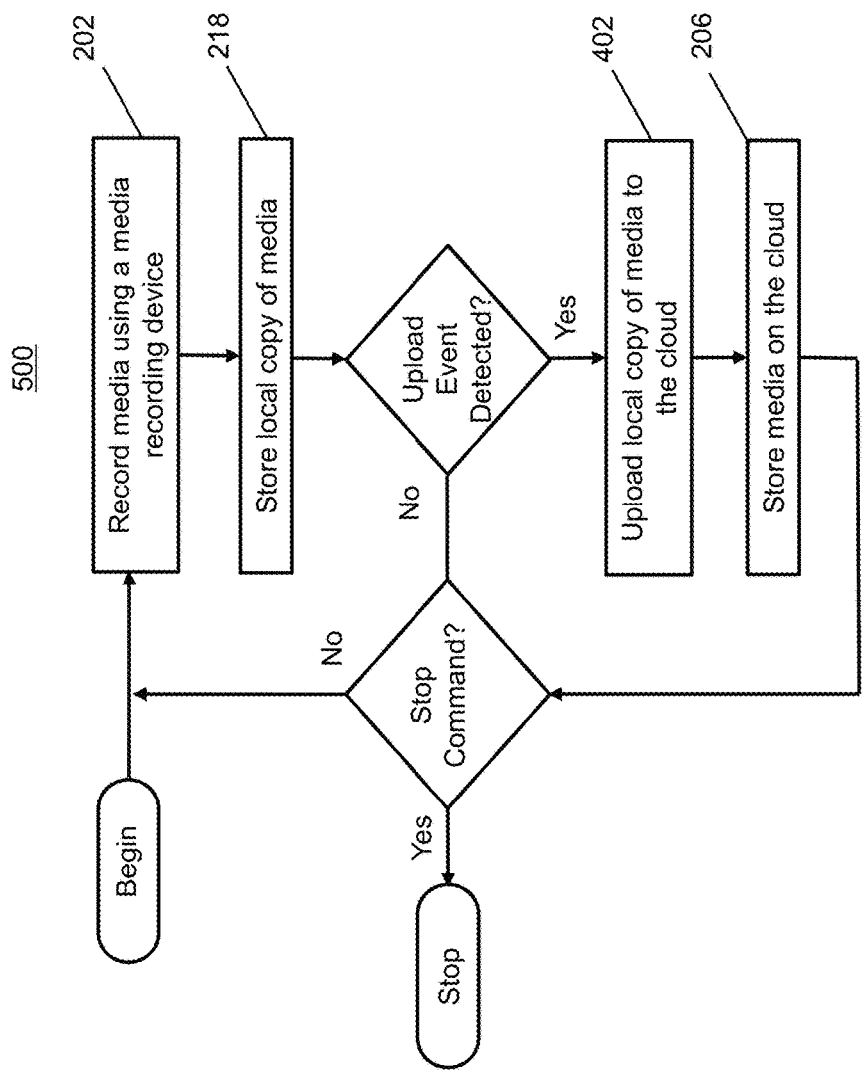
FIG. 5A depicts a twelfth exemplary method in accordance with the invention.
Figure 5B:
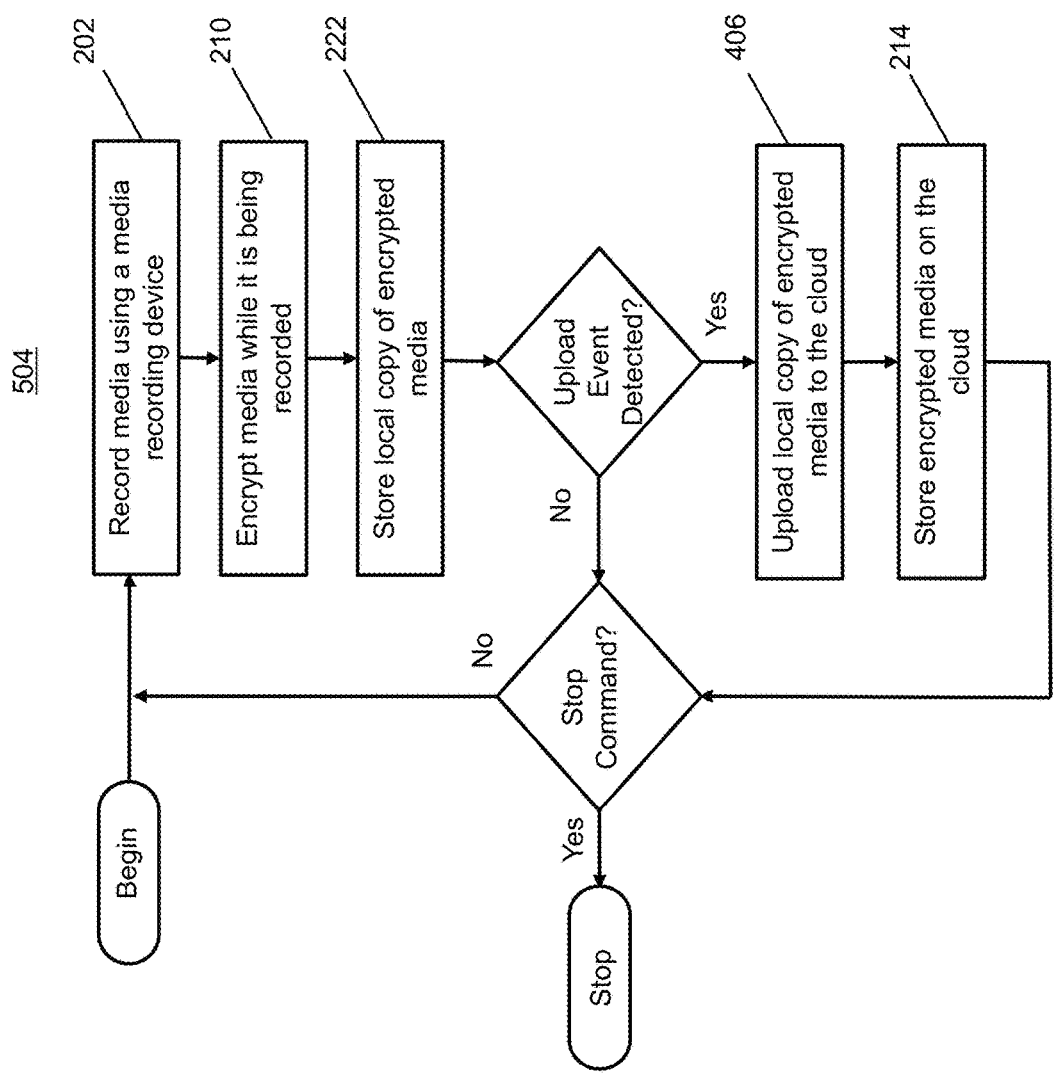
FIG. 5B depicts a thirteenth exemplary method in accordance with the invention.
Figure 5C:
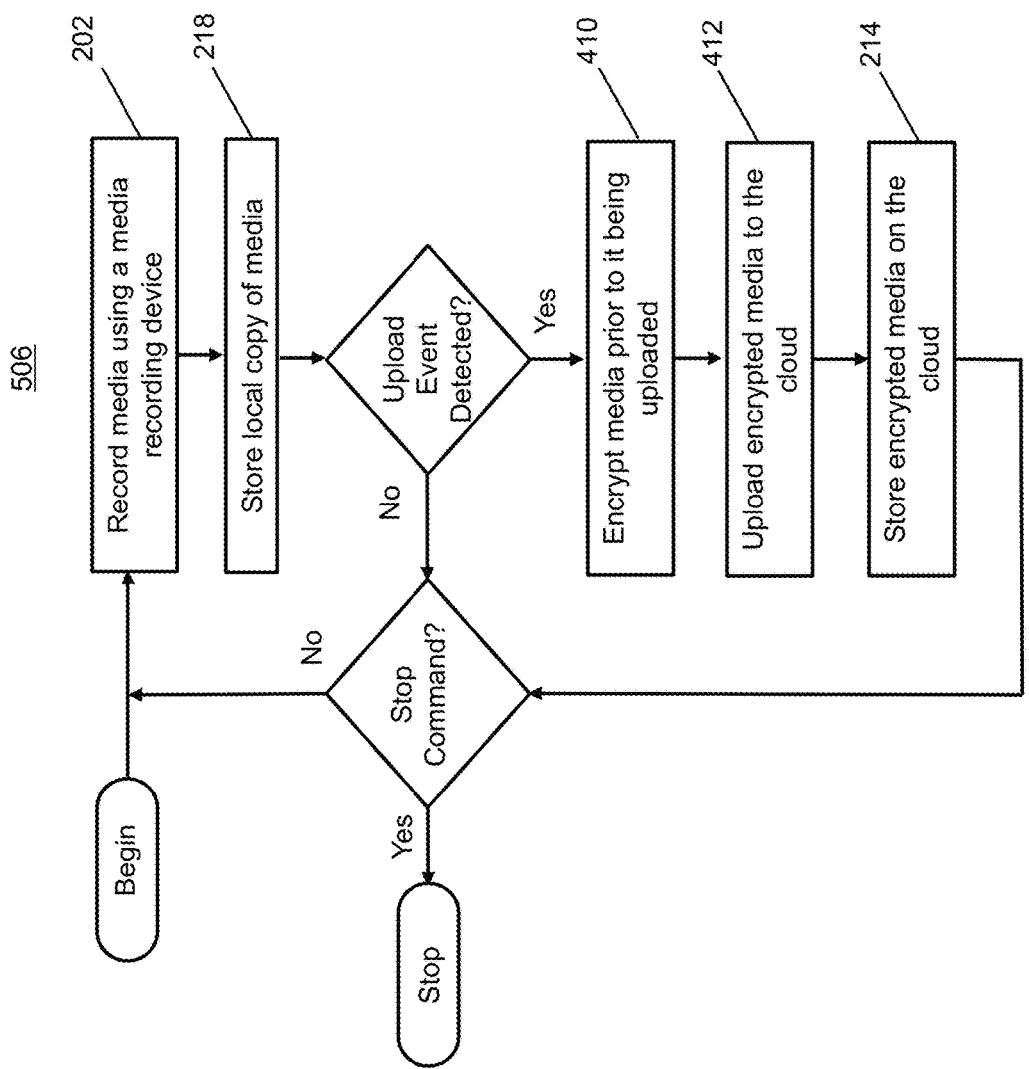
FIG. 5C depicts an fourteenth exemplary method in accordance with the invention.

FIGS. 5A-5C depict exemplary methods corresponding to an event-activated update mode, where the amount of data latency between the time uploading of a stored media begins until it is stored on the cloud depends on whether or not the media is encrypted by the media recording device. In reference to FIG. 5A, one skilled in the art will recognize that once media has been received by the cloud it may be encrypted by a cloud service provider prior to storage or at any time thereafter.

Figure 6:
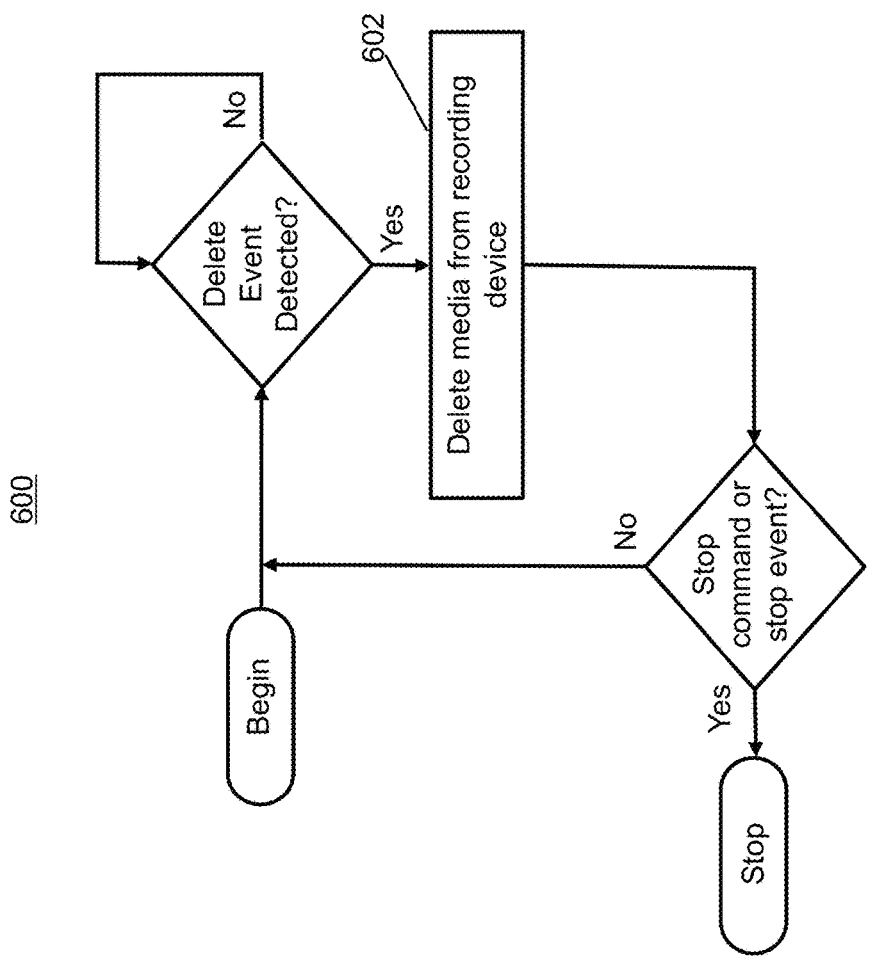
FIG. 6 depicts a fifteenth exemplary method in accordance with the invention.

Under a fifth arrangement, a local copy of a recorded media is deleted upon the occurrence of an event, such as described above. FIG. 6 depicts an exemplary method corresponding to an event-activated delete mode.

Various metadata can be conveyed to the cloud along with the media data such as the media author, media title, date and time of the media recording, location and/or orientation of the media recording device, velocity, acceleration, temperature, barometric pressure, biometric data, light levels, etc. Metadata might include the person or persons in a video, or a short description or keyword(s) such as wedding, pet's name, flowers, waterfall, food, or the like. Generally, one skilled in the art will understand that such metadata can be used to enable processing of the media data from the cloud to include a user retrieving a subset or subsets of such media data based upon a query of the metadata stored along with the media data. Whether or not metadata is added to media prior to it being conveyed to the cloud can also be controlled in accordance with a data latency limit in a manner similar to how encryption can be controlled. Similarly, whether or not metadata is added to media prior to it being conveyed to the cloud can also be controlled in accordance with an established rule and one or more conditions of a situation. Under one arrangement, metadata (e.g., timing and location) corresponding to one or more records corresponding to one or more recorded media of one or more recorded media devices may be used to located the source of a sound as recorded by the one or more media recording devices, where one skilled in the art will recognize that one recorded sound might provide a range of the source relative to a recording device, two recordings of the sound may determine a plane relative to the locations of the recording devices, and three recordings of the sound may identify a coordinate of the source relative to the three recording devices. A source of a sound could be, for example, a gun or a tornado. One skilled in the art will recognize that all sorts of data processing involving multiple recorded media data by one or more media recording devices are possible.

A user interface could be used to define the events, rules, and conditions required to support event-activated approaches described herein. Similarly, a user interface can be used to define limits such as latency limits, to manage encryption, and to enter metadata. Similarly, a user interface can be used to produce queries used to retrieve media data from the cloud. Generally, one skilled in the art of data management will understand that such interfaces can be employed to practice the invention.

The following are examples of the use of the present invention:
- a baby monitoring system whereby a sensed condition such as a temperature, irregular heartbeat, or the like cause the baby monitoring system to convey sound, video, and sensor information to the cloud, where it may then be forwarded to medical personnel either manually or automatically as part of a service.
- a business security system whereby a detected forced entry automatically conveys security footage to the cloud, where it may then be forwarded to security personnel or police either manually or automatically as part of a service.
- a structure health monitoring system whereby upon the occurrence of an earthquake sensor information pertaining to the health of the structure (e.g., bridge, building, dam, etc.) is automatically conveyed to the cloud where video footage may also be automatically recorded and conveyed.
- a personal video monitoring system worn on a person automatically beginning recording and conveying video and/or sensor information to the cloud upon recognition of an irregular heartbeat or other sensed characteristic of a person, which might result from fear, an accident, a medical condition (e.g., a diabetic seizure), excitement, or the like.
- a vehicle monitoring system that begins recording occurrences outside the vehicle and/or inside the vehicle given a sensed condition such as a break-in of the vehicle, the vehicle being in an accident, the vehicle being driven recklessly, etc.
- a drone-based video surveillance system reacts to an occurrence on the ground (e.g., a detected explosion) by directing the drone to reduce altitude or alter course so as to achieve a different surveillance location or to cause a zoom function in a camera to zoom in so as to better view the occurrence on the ground.

The present invention can be practiced using publicly available computing devices, communications networks, and related software or can be practiced using proprietary computing devices, communications networks, and/or software. Rules and thresholds and the like can be established for one or more media recording devices using one or more computing device (e.g., a desktop computer) other than a recording device. Similarly, an interface can be provided to access media data stored on the cloud via computing devices other than a media recording device. Under one arrangement, a product is provided that includes a software application resident on a media recording device and a software application resident on a computing device other than a recording device. For example, an application running on a cell phone may store media data to the cloud that is later accessed via a desktop computer via an internet connection. Similarly, an application (e.g., a dashboard) executing on a desktop computer may be used to configure parameters (e.g., rules, thresholds, etc.) relating to a user account that are then loaded by a cell phone application and used to manage the conveyance of recorded media data to the cloud by the cell phone. Under another arrangement, one or more other applications used to manage events such as a calendar management application (e.g., Microsoft Outlook®) can be used to establish and manage events that are used to manage the conveyance of media data to the cloud. For example, a meeting request received via an email may establish a location and a time used in a rule used to manage the conveyance of media data to the cloud. Similarly, an alert condition established in a weather alert application might be inherited by another application managing the conveyance of media data to the cloud. Under yet another arrangement, the application managing the conveyance of media data to the cloud may interface with one or more publicly available data sources (e.g., National Weather Service, USGS Earthquake Early Warning system, a RSS news blog) and/or private data sources (e.g., a Social Directory API), where data provided by the one or more publicly available data sources and/or private data sources may be used, for example, to determine the occurrence of an event.

The present invention may be used as part of a monitoring service where the control of media recording functions can be at least partially managed by the monitoring service. For example, one or more media recording devices within a home or business may be activated based on a detected condition, a schedule, or as part of a random status check, where certain parameters are controllable by a user (e.g., home owner, business owner).

The present invention may take advantage of artificial intelligence algorithms that enable a media recording device to establish its own rules make its own decisions regarding which functions should be employed and to what extent as determined based on one or more events.

Under one arrangement, a media recording device may be configured to operate without displaying images being recorded on the display of the device. For example, a phone may be filming and streaming a video to the cloud without displaying the video on the display of the phone. This 'non-display recording mode' might be activated by a user selecting a button, providing a voice command, or automatically due to the occurrence of an event (e.g., a detected abrupt movement), etc. in the same manner as media recording can be activated.

In accordance with an embodiment of the invention, multiple media recording devices may be configured to collaborate. In one arrangement, data samples from different devices can have relative timings that are coordinated. For example, if three media recording devices are recording the same event from three different locations the their data samples may have staggered timing such that the timing of data samples from the first media recording device may be provided every 3 seconds beginning at time $t_0$, data samples from the second media recording device may be provided every 3 seconds beginning at time $t_0+1$ second, and data samples from the third media recording device may be provided every 3 seconds beginning at time $t_0+2$ second. Alternatively, two or more media recording devices may coordinate their times such that they take data samples at substantially the same times, $t_0$, $t_1$, $t_2$, etc. Other forms of collaboration include: 1) sharing of rules, thresholds, sensor information, and the like such that a set of parameters can be established that is used to manage conveyance of media data produced by multiple media recording devices, 2) sharing of recorded data among media recording devices allowing the display of information from multiple devices as an event is being recorded by the devices, 3) sharing of warnings and messages between devices upon occurrences of events (e.g., Fred's phone is code red and located at x,y,z coordinates).

Figure 7:
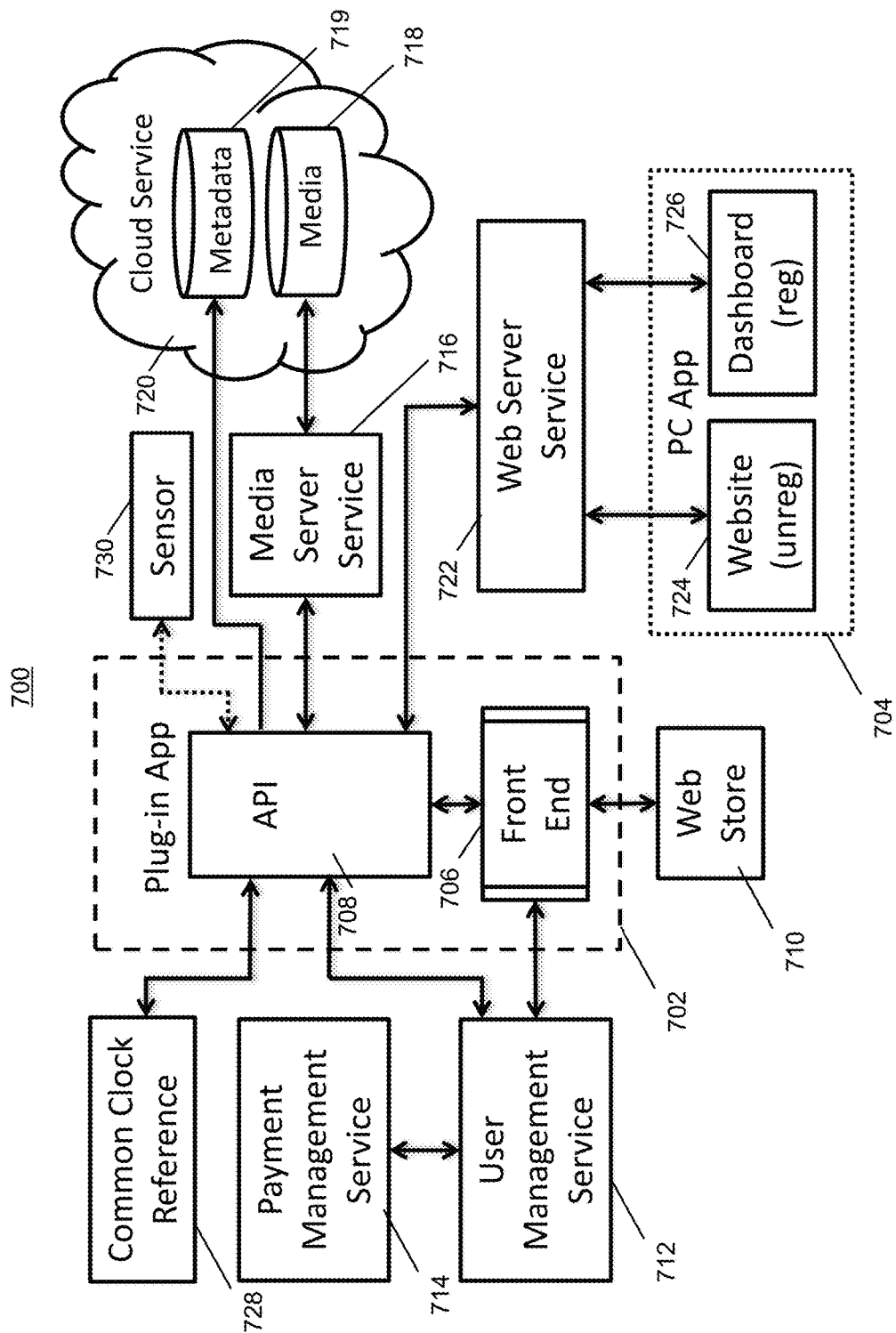
FIG. 7 depicts an exemplary computing architecture in accordance with the invention.

FIG. 7 depicts an exemplary computing architecture 700 in accordance with the invention. Referring to FIG. 7, the computing architecture 700 includes a plug-in application 702 (e.g., a cell phone 'app') and a PC application 704. The plug-in application 702 includes a front end 706 and an application program interface (API) 708. The front end 706 provides a user interface that enables a user to log into the application which would involve use of a user management service 712, which provides user login and authentication capabilities, and corresponding payment management service 714, which provides for various means of payment for the application's services, products, etc. The user management service 712 provides notification to the API 708 that the user is authorized (i.e., authenticated and appropriates payments have been made) to use the application. The API 708 interfaces with a cloud service 720 and interfaces with a media server service 716 which streams media data to one or more media file databases 718, which may be provided by a cloud service or by another data storage service 720. The API 708 also provides metadata associated with the media data to one or more metadata file databases 719. The API 708 also interfaces with a web server service 722, which interfaces with a website 724 and a dashboard 726, with a common clock reference 728 and may optionally interface with a sensor 730. The website 724 provides unregistered users a product description, pricing, and a product registration form. Once registered, a user is able to access the dashboard 726 that can be used to configure parameters relating to the user's account and provides access to the user's media files.

In accordance with another aspect of the present invention, a plurality of media recording devices interfaced with a cloud computing environment convey a corresponding plurality of recorded media and metadata to the cloud computing environment, where the plurality of recorded media and metadata may or may not correspond to multiple views of the same event, and where the metadata enables the plurality of recorded media to by synchronized. The metadata includes time samples in accordance with a common time reference (i.e., a universal clock, atomic clock, NIST, US Naval Observatory clock, etc.) and may include magnetometer data that can be used to determine the view angle of a media recording device (e.g., a smartphone) and/or location information from a location system such as GPS location information. One skilled in the art will recognize that the plurality of media recording devices may record media and store metadata without using the cloud.

The present invention enables multiple individuals to use multiple media recording devices, for example, smartphones to independently record an event (e.g., a baseball game) from different locations, where the beginning and ending recording times of the corresponding multiple recorded views of the event are determined by the individuals recording the different view (or media clip) of the event. The metadata stored during the recording by the media recording devices allows the various recorded media clips to then be synchronized such that multiple views of an event can be used collaboratively to produce composite videos that may combine the best views taken during periods of time.

Referring again to the architecture of FIG. 7, the plug-in application 702 running on the multiple smartphones of multiple individuals is used to record multiple views of an event where the media and metadata corresponding to the multiple views is stored in a media database 718 and metadata database 719 provided by a cloud service or another data storage service 720. A PC application 704 (aka. a dashboard application) of any one of the multiple individuals can be provided the media and metadata of the multiple views of the event where the views can be synchronized and combined in various ways to produce various composite videos made up of different views of the event recorded by the multiple smartphones.

Figure 8:
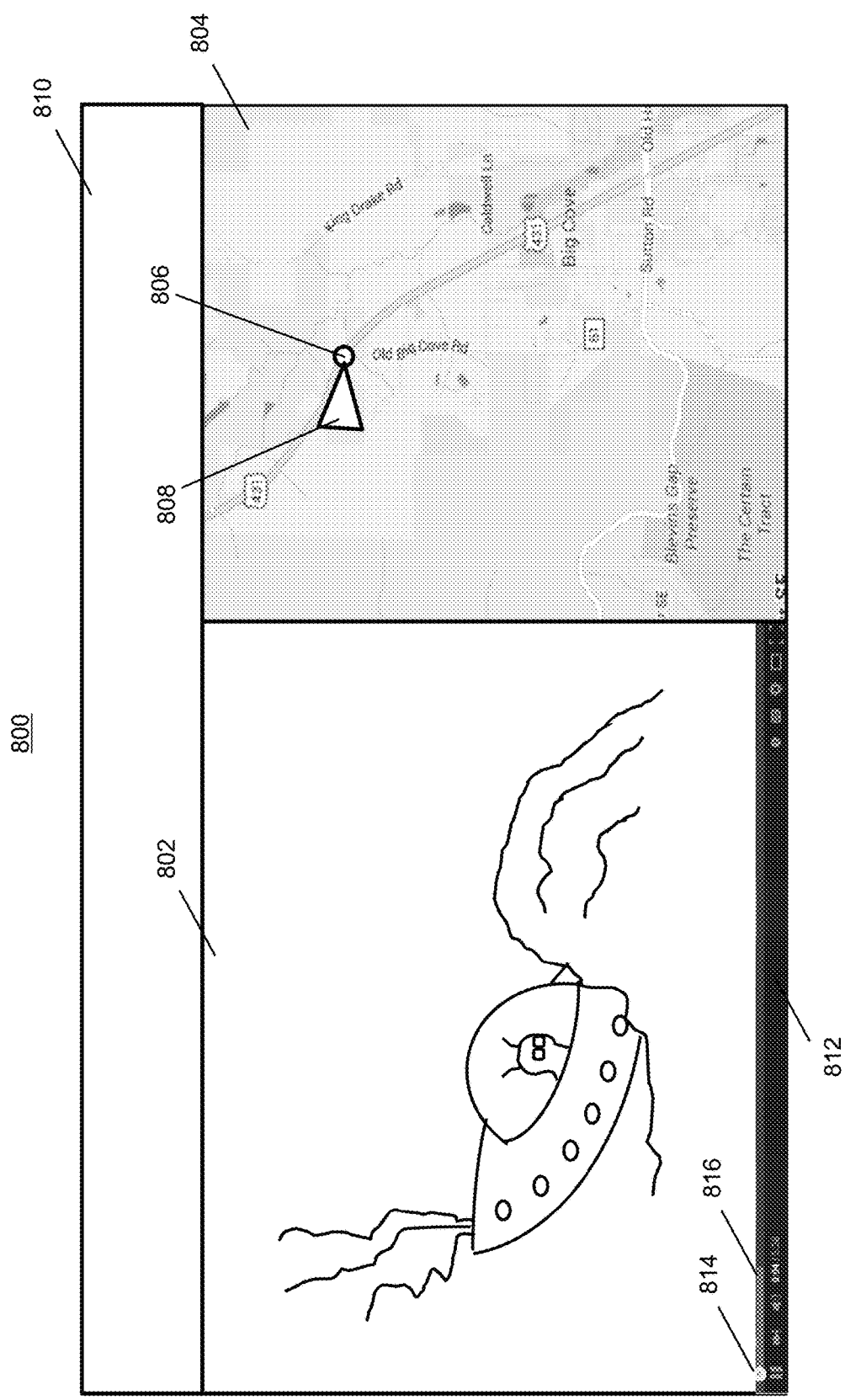
FIG. 8 depicts an exemplary graphical user interface of a media player for playing a single view of an event using media and metadata corresponding to the event in accordance with the invention.

FIG. 8 depicts an exemplary graphical user interface (GUI) 800 of a media player of a PC application 704 for playing a single view of an event using media and metadata corresponding to the event. Referring to FIG. 8, the GUI includes a media player viewing window 802 and a location/view angle indicator window 804, which would typically display a coordinate system, a floor plan, a map or any other of various types of locational information that would provide an indication of the location 806 of a media recording device and also the view angle 808 of the media recording device which is indicated by a cone. The location/view angle indicator window 804 may also include various other types of information such as weather radar, satellite imagery, and the like. The GUI includes an information window 810, which can be used for displaying the product name, logos, a banner, advertisements, and other information. The media player viewing window 802 is controlled using media player controls 812, which typically includes a current frame control 814 shown on a timeline 816 as well as various other control buttons for controlling basic media player functions (e.g., pause/play, fast forward, time, closed caption, full screen, sound control, zoom, etc.).

The location/view angle indicator window is shown as a plan view but could alternatively be presented using three dimensional viewing techniques to as to indicate view elevation. View elevation might also be indicated using a numerical indication.

Figure 9:
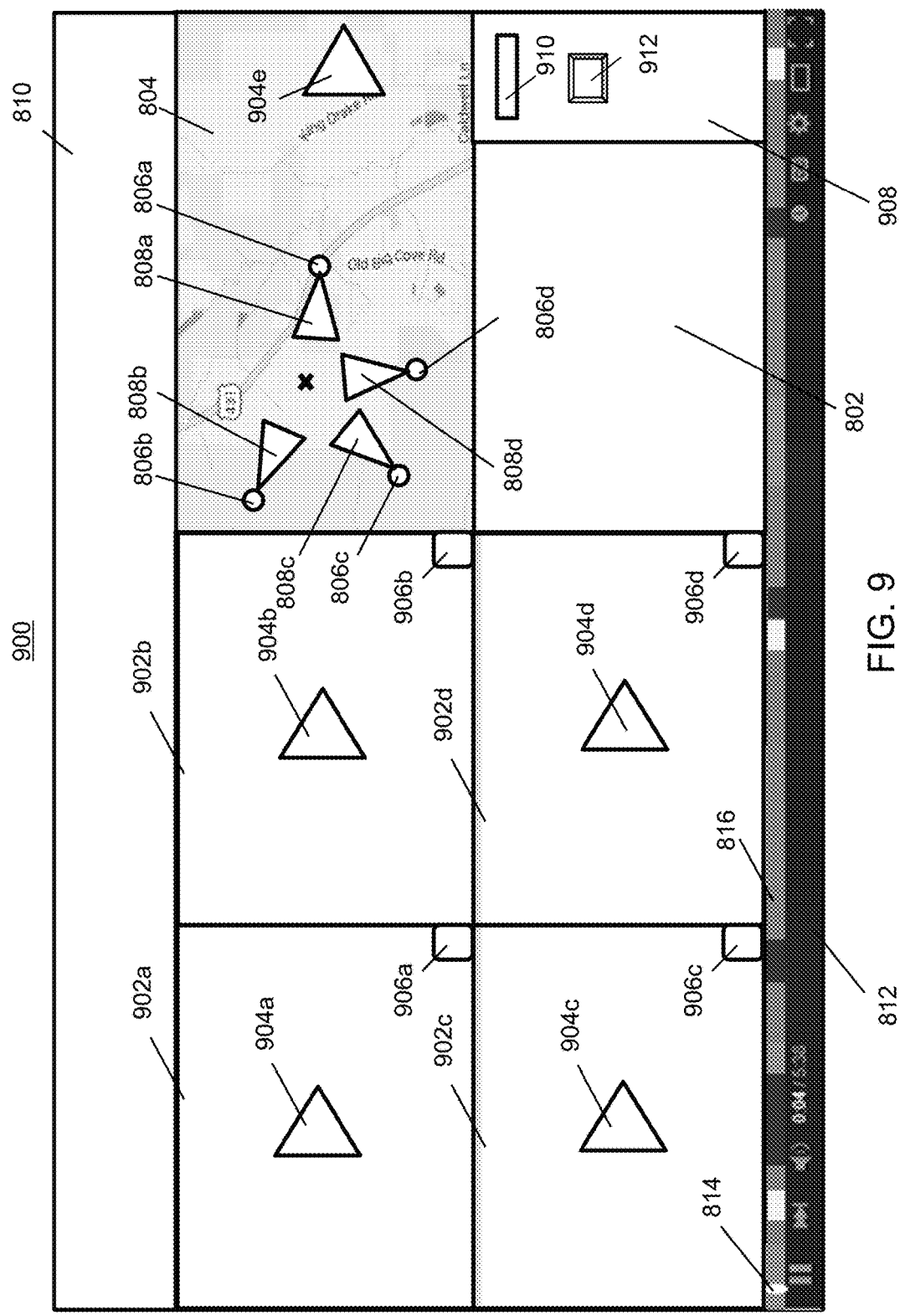
FIG. 9 depicts an exemplary graphical user interface of a multiple view media player for producing a composite video from media and metadata corresponding to multiple views of an event in accordance with the invention.

FIG. 9 depicts an exemplary GUI 900 of a multiple view media player of a PC application 704 for producing a composite video from media and metadata corresponding to multiple views of an event. Referring to FIG. 9, the GUI 900 includes a media player viewing window 802, a location/view angle indicator window 804, an information window 810, and media player controls 812 like the GUI 800 of FIG. 8. As seen in the location/view angle indicator window 804, the locations 806a-806d of multiple media recording devices are indicated along with their respective view angles as indicated by cones 808a-808d. Four multi-view media player viewing windows 902a-902d are used to display the multiple views of the event as recorded by the multiple media recording devices having the locations 806a-806d and viewing angles 808a-808d. The multi-view media player viewing windows 902a-902d each have corresponding selection icons 904a-904d, which in a preferred embodiment are color-coded, and view mode control buttons 906a-906d for controlling the viewing mode of each respective viewing window 902a-902d. The view mode control buttons 906a-906d are used to select which view is being played during a given period of time as part of the overall timeline of a composite video, where essentially the composite video consists of a sequence of selected views. An additional selection icon 904e is shown in the location/view angle indicator window 804, which allows the window 804 to be selected and included in a composite video. In a preferred embodiment the timeline 816 of the composite video is color-coded consistent with the color coding of the selection icons 904a-904d corresponding to the views selected for the different portions of the composite video. Viewing modes may include may include, for example, OFF, PLAY, and PERIODIC FRAME modes, where the PLAY mode the media normally and the PERIODIC FRAME mode samples frames from the media data periodically (e.g., once per second) and displays the same frame for a period of time. Generally, the PERIODIC FRAME mode reduces bandwidth requirements but also reduces overall movement in the GUI, which might be preferable to certain users when selecting among views. Views may be played simultaneously or may be played one at a time. Non-selected views may update frames periodically (e.g., once per second) whereas the selected view plays normally.

To the right of the media player viewing window 802 is a view control window 908, which may include various functions specific to the multiple views or to the composite video. For example, a speed control 910 could be used to vary the speed (e.g., slow motion) at which one or more views is playing or a multi-view combination control 912 might be used, which causes a sequence of different views of the same or otherwise overlapping periods of time (e.g., four view angles of a bat hitting the winning home run). Generally, different types of view editing functions can be included in the view control window 908.

In accordance with another aspect of the invention, metadata files can be used by a plurality of media service providers to enable their media products to be synchronized, where such media products may involve videos, still camera images, animations, GUIs, etc. As such, different vendor products can be used to produce composite products. For example, a provider of digital score board displays for sporting events could provide metadata files with its display data files enabling the displays to be integrated with other products that could benefit from the displays.

FIG. 10 depicts an exemplary GUI 1000 of a multiple view media player of a PC application 704 for producing a composite video from media and metadata corresponding to multiple views of a baseball game, which includes products that might be provided by other service providers. For example, the information window 804 of the GUI 1000 might depict a baseball park 1002, which might be a live video image or images, a digital scoreboard 1004, and a digital scorebook 1006, which might be provided by other service providers but integrated into the GUI and synchronized with the multiple views of the baseball game using the metadata provided by the various service providers. As shown, selection icons 904e-904g can be associated with the output of these third party products, which causes their images to be included in a composite video.

Generally, the present invention enables various types of specialized theme-based PC applications 704 having GUIs that are tailored for specific types of events such as sporting events (e.g., tennis, basketball, soccer, baseball, football, volleyball, etc.), weddings, concerts, plays, recitals, political events, and any other type of event where specialized products can be integrated as a result of product vendors complying with metadata requirements that enable synchronization of products. Such specialized PC applications 704 can have advertising focused on specific groups that would be interested in the specific type of events. For example, advertisements targeted at baseball fans might be displayed on a GUI having a baseball theme.

In accordance with a still further aspect of the invention, a multiple view video data package comprising a plurality of media files and metadata files corresponding to multiple views of a recorded event can be posted to an internet media-sharing website (e.g., YouTube®) of FaceBook®), where the package may or may not include one or more composite videos produced using the plurality of media files and metadata files. As such, other users of the media-sharing website can comment on and rate (e.g., thumbs up or down) a composite video and/or can download the media files and metadata files corresponding to the recorded event to their own PC applications 704 allowing them to produce their own composite video(s). Alternatively, the internet media-sharing website might provide a real-time dashboard application for producing a composite video using the media files and metadata files.

As such, the present invention enables a new collaborative media sharing environment whereby users can combine views taken from their smartphones with other views or otherwise participate in the creation of composite videos from whatever views of an event are available. Users can post their multiple view video data packages and/or media and metadata for a single view using an identifier such as a Hashtag #.

Moreover, various other social media products can be leveraged including Twitter®, which might be used to organize views in real time (e.g., someone needs to move to the right of the stage to get a view . . . ). Similarly, applications such as LinkedIn® might be used to organize the views recorded by different groups or organizations.

In accordance with an aspect of the invention, information may be displayed at an event that can be captured with a media recording device and be used to coordinate a collaborative recording of media relating to an event. For example, a barcode (or QR code) can be displayed on a placard, on a display, or in a program for an event that a user of a smartphone can use the camera of the smartphone to take a picture of the barcode, where a software application running on the phone would decipher the barcode information and use it to coordinate the collaborative recording of media relating to the event. Under one arrangement, a person organizing the collaborative recording of media relating to an event can provide information to a graphical user interface of a software application that subsequently can create a barcode (or QR code), which can then be displayed at an event such that it can be captured by media recording devices of persons wanting to participate in the collaborative recording of media relating to the event.

To support synchronization, digital watermarks might be placed on certain frames during the recording of an event and a dashboard application might vary relative time bases of different views using the digital watermarks.

In accordance with a further aspect of the invention, the media and metadata corresponding to a given recorded event can be made publicly available or access to such media and metadata can be controlled such that it is only provided to one or more authorized persons. Under one arrangement, a service provider may convey media and metadata to authorized users in accordance with access control permissions which may administered using one or more layers of administration that control membership in groups where access to media and metadata may involve an access control list, a password, and/or a role. Generally, control of access to media and metadata can be controlled in the same or similar way that access to location based information is described in U.S. Pat. No. 7,525,425, which is incorporated by reference herein in its entirety. More particularly, a person who records an event can be considered the owner of the corresponding recorded media and metadata and can determine which other person or persons have access to such data. For example, an owner of certain media and metadata may restrict access to persons included on an access control list, persons that know a password, or persons provided access because of a role (e.g., a detective, an administrator, etc.). Alternatively, a person may request an owner to provide access to certain media and metadata, which might be granted electronically, for example, by an owner responding to an automated permission message in a manner similar to how a LinkedIn® connection can be requested and accepted.

In accordance with yet another aspect of the invention, a media recording device may include or be interfaced to a local media server or a data buffering device which might be a memory card, thumb drive, or the like that enables media data and metadata to be stored periodically, for example, during a loss of a data link to the cloud. Under one arrangement, data may be automatically buffered to a local media server or a data buffering device until successfully conveyed to the cloud in what can be described as store and forward streaming to the cloud. Under another arrangement buffering to a local media server or a buffering device only occurs when a link to the cloud is unavailable.

While particular embodiments of the invention have been described, it will be understood, however, that the invention is not limited thereto, since modifications may be made by those skilled in the art, particularly in light of the foregoing teachings.

The invention claimed is:

1. A system for data synchronization, comprising:
   a data storage configured to store a plurality of recorded data files and a plurality of metadata files;
   a plurality of data recording devices, each said data recording device of said plurality of data recording devices comprising:
      a communications interface, said communications interface configured to establish communications with an atomic clock across a network; and
      a processor, said processor configured to control the storing in said data storage of a metadata file of said plurality of metadata files with a recorded data file of said plurality of recorded data files, said recorded data file being at least one of a recorded media file or a recorded sensor data file that was independently and asynchronously recorded by said data recording device, said metadata file including a time sample received from said atomic clock; and
   a software application that receives said plurality of recorded data files and said plurality of metadata files from said data storage and uses said plurality of metadata files to synchronize said plurality of recorded data files, said software application being resident on a computing device other than said data recording device of said plurality of recording devices.

2. The system of claim 1, each data recording device of said plurality of data recording devices further comprising:
   a magnetometer that provides a magnetometer measurement of the view angle of said data recording device, said metadata file including said magnetometer measurement.

3. The system of claim 1, each data recording device of said plurality of data recording devices further comprising:
   a location system that provides location information of the location of said data recording device within a coordinate system, said metadata file including said location information.

4. The system of claim 1, each said data recording device of said plurality of data recording devices further comprising:
   a movement measurement device that provides a movement measurement of the movement of said data recording device, said metadata file including said movement measurement.

5. The system of claim 1, each said data recording device of said plurality of data recording devices further comprising:
   a sensor that provides an environmental measurement of an environmental condition, said metadata including said environmental measurement.

6. The system of claim 1, each said data recording device of said plurality of data recording devices further comprising:
   a sensor that provides a physical condition measurement of a physical condition of a person or animal, said metadata file including said physical condition measurement.

7. The system of claim 1, wherein each said data recording device is a smartphone.

8. The system of claim 1, wherein each said data recording device is a still camera.

9. The system of claim 1, wherein each said data recording device is a video camera.

10. The system of claim 1, wherein each said data recording device is an audio recorder.

11. A method for data synchronization, comprising:
providing a data storage used to store a plurality of recorded data files and a plurality of metadata files; and
providing a plurality of data recording devices, each said data recording device of said plurality of data recording devices independently and asynchronously producing a recorded data file of said plurality of recorded data files, said recorded data file being at least one of a recorded media files or a recorded sensor data file, each said data recording device having a communications interface that establishes communications with a common clock reference across a network, each said data recording device of said plurality of data recording devices producing a metadata file, said metadata file including a time sample received from said common clock reference, said common clock reference being an atomic clock;
controlling the storing of said plurality of recorded data files and said plurality of metadata files in said data storage; and
providing a software application that receives said plurality of recorded data files and said plurality of metadata files from said data storage and uses said plurality of metadata files to synchronize said plurality of data files, said software application being resident on a computing device other than said data recording device of said plurality of recording devices.

12. The method of claim 11, further comprising:
providing a magnetometer measurement of the view angle of each said data recording device, said metadata file including said magnetometer measurement.

13. The method of claim 11, further comprising:
providing location information of the location of each said data recording device within a coordinate system, said metadata file including said location information.

14. The method of claim 11, further comprising:
providing a movement measurement of the movement of each said data recording device, said metadata file including said movement measurement.

15. The method of claim 11, further comprising:
providing an environmental measurement of an environmental condition, said metadata file including said environmental measurement.

16. The method of claim 11, further comprising:
providing a physical condition measurement of a physical condition of a person or animal, said metadata file including said physical condition measurement.

17. The method of claim 11, wherein each said data recording device comprises one of a smartphone, a still camera, a video recorder, an audio recorder, or a sensor.

* * * * *